(12) United States Patent
Tuck et al.

(10) Patent No.: US 11,892,546 B2
(45) Date of Patent: Feb. 6, 2024

(54) SYSTEMS AND METHODS FOR DETECTING AND MITIGATING SPOOFED SATELLITE NAVIGATION SIGNALS

(71) Applicant: QUALCOMM Incorporated, San Diego, CA (US)

(72) Inventors: David Tuck, San Juan Capistrano, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/389,216

(22) Filed: Jul. 29, 2021

(65) Prior Publication Data
US 2022/0221587 A1   Jul. 14, 2022

Related U.S. Application Data

(60) Provisional application No. 63/059,104, filed on Jul. 30, 2020.

(51) Int. Cl.
*G01S 19/21*   (2010.01)
*G01S 19/42*   (2010.01)
(Continued)

(52) U.S. Cl.
CPC ............ *G01S 19/215* (2013.01); *G01S 19/42* (2013.01); *G01S 19/07* (2013.01); *G01S 19/40* (2013.01); *H04W 4/021* (2013.01)

(58) Field of Classification Search
CPC ........ G01S 19/215; G01S 19/07; G01S 19/40; G01S 19/41; G01S 19/42; H04W 4/021
(Continued)

(56) References Cited

U.S. PATENT DOCUMENTS

| 7,250,903 B1 | 7/2007 | McDowell |
| 7,940,213 B2 * | 5/2011 | Harper ................. G01S 19/215 342/357.59 |

(Continued)

FOREIGN PATENT DOCUMENTS

| DE | 102018220793 A1 | 6/2020 |
| EP | 2924662 A1 | 9/2015 |

(Continued)

OTHER PUBLICATIONS

International Search Report and Written Opinion—PCT/US2021/043837—ISA/EPO—dated Dec. 2, 2021.

*Primary Examiner* — Chuong P Nguyen
(74) *Attorney, Agent, or Firm* — Thien T. Nguyen

(57) ABSTRACT

Determining a boundary of a spoofing region identifying spoofed satellite signals may comprise determining, based on a first set of Global Navigation Satellite System (GNSS) signals received at a GNSS receiver over a first period of time, at least one GNSS signal corresponding to a GNSS satellite has experienced a first transition, wherein the first transition comprises a transition from a not spoofed state in which the at least one GNSS signal is not determined to be spoofed to a spoofed state in which the at least one GNSS signal is determined to be spoofed, or a transition from the spoofed state to the not spoofed state. Additionally, a first location corresponding to a location at which the GNSS receiver was located during the first transition may be determined.

28 Claims, 10 Drawing Sheets

(51) Int. Cl.
*G01S 19/07* (2010.01)
*H04W 4/021* (2018.01)
*G01S 19/40* (2010.01)

(58) Field of Classification Search
USPC .... 342/352, 357.23, 357.24, 357.25, 357.44, 342/357.59
See application file for complete search history.

(56) References Cited

U.S. PATENT DOCUMENTS

| | | | |
|---|---|---|---|
| 9,185,516 | B2 | 11/2015 | Fischer et al. |
| 9,725,171 | B1 * | 8/2017 | Carmack ................ G05D 1/102 |
| 10,466,700 | B1 | 11/2019 | Carmack et al. |
| 10,983,220 | B2 * | 4/2021 | Ashjaee ................ G01S 19/28 |
| 11,163,068 | B2 | 11/2021 | Balog et al. |
| 11,555,931 | B2 * | 1/2023 | Söderholm ............. G01S 19/03 |
| 2011/0227787 | A1 * | 9/2011 | Gum .................... G01S 19/215 |
| | | | 342/357.28 |
| 2016/0223678 | A1 | 8/2016 | Kim et al. |
| 2017/0070971 | A1 | 3/2017 | Wietfeldt et al. |
| 2019/0154839 | A1 * | 5/2019 | Ashjaee ................ G01S 19/42 |
| 2019/0377094 | A1 | 12/2019 | Lentz et al. |
| 2021/0088672 | A1 | 3/2021 | Balog et al. |
| 2021/0109228 | A1 | 4/2021 | Rautalin |
| 2021/0333410 | A1 | 10/2021 | Gum et al. |
| 2021/0333411 | A1 | 10/2021 | Gum et al. |
| 2021/0405213 | A1 | 12/2021 | Tuck et al. |
| 2022/0021702 | A1 | 1/2022 | Bouthemy |
| 2022/0035044 | A1 | 2/2022 | Cookman et al. |
| 2022/0338014 | A1 * | 10/2022 | Luomi .................. H04W 12/66 |
| 2022/0342082 | A1 * | 10/2022 | Zhang ................... G01S 19/215 |
| 2022/0350030 | A1 * | 11/2022 | Shuman ................ G01S 19/215 |
| 2022/0353688 | A1 * | 11/2022 | Shuman ................ G01S 19/48 |
| 2022/0357460 | A1 * | 11/2022 | Schmidt Diaz ....... G01S 19/215 |
| 2023/0142516 | A1 * | 5/2023 | Broumandan ........ G01S 19/215 |
| | | | 342/357.59 |

FOREIGN PATENT DOCUMENTS

| | | | | |
|---|---|---|---|---|
| EP | 2930536 A2 | | 10/2015 | |
| JP | 2008510138 A | * | 4/2008 | ............... G01S 5/14 |
| WO | WO-2021091414 A1 | | 5/2021 | |

* cited by examiner

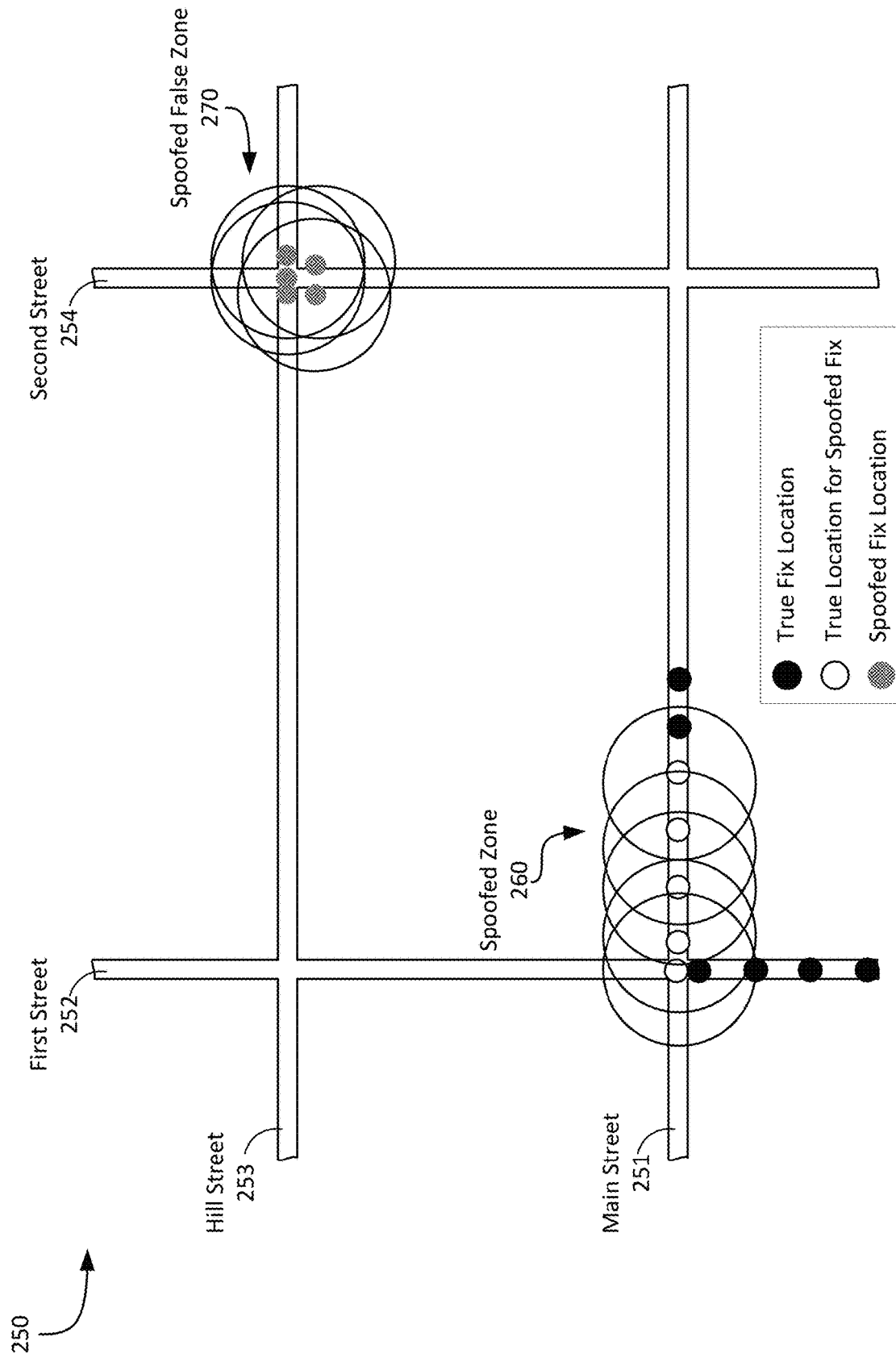

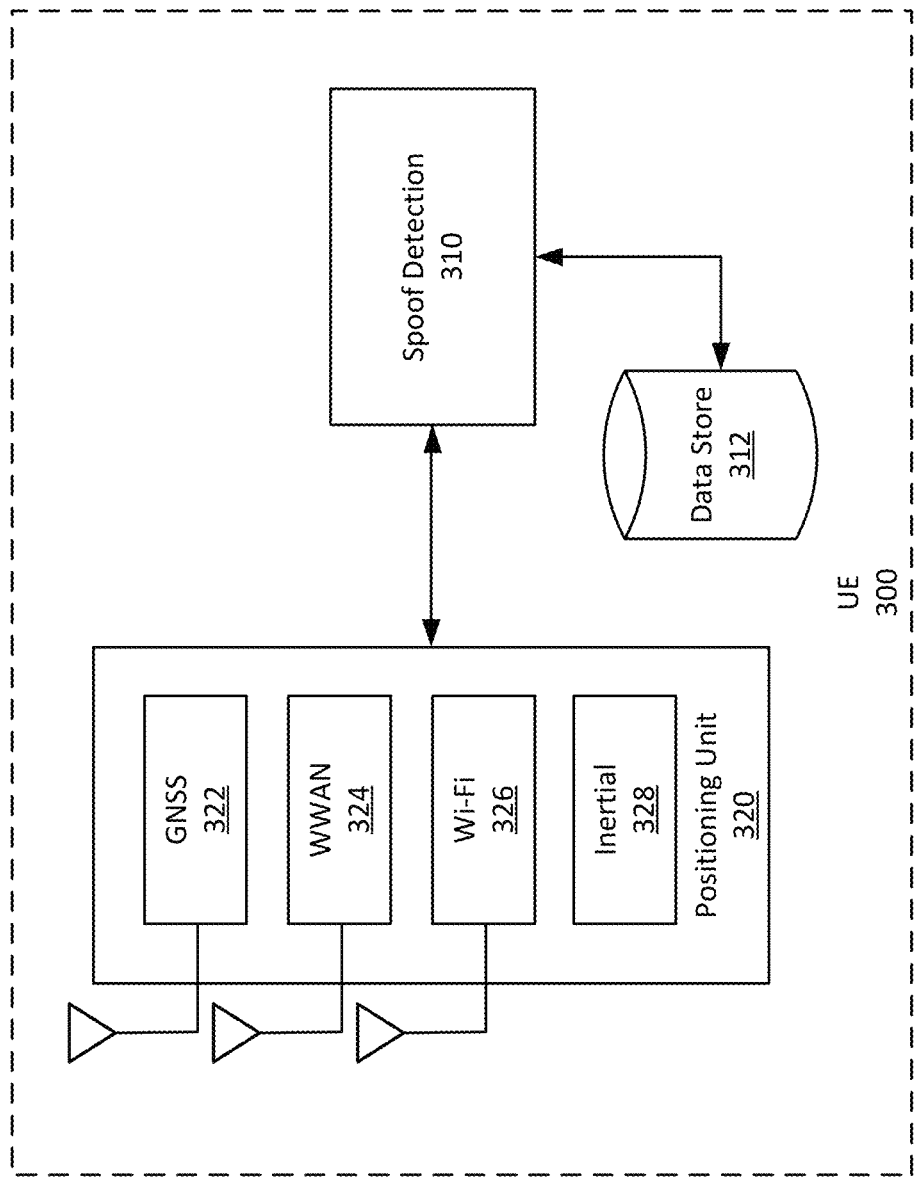

SYSTEMS AND METHODS FOR DETECTING AND MITIGATING SPOOFED SATELLITE NAVIGATION SIGNALS

RELATED APPLICATIONS

This application claims the benefit of U.S. Provisional Application No. 63/059,104, filed Jul. 30, 2020, entitled "SYSTEMS AND METHODS FOR DETECTING AND MITIGATING SPOOFED SATELLITE NAVIGATION SIGNALS", which is assigned to the assignee hereof, and incorporated herein in its entirety by reference.

BACKGROUND

Modern electronic devices frequently include systems that can receive signals from satellite navigation systems, commonly referred to as global navigation satellite systems (each a "GNSS"), and use those signals to determine the location of the device, as well as other information such as speed, heading, altitude, etc. Such GNSS receivers may be integrated into consumer electronic devices, such as smartphones or smartwatches, as well as into navigation systems in different types of vehicles, including cars, trucks, ships, and aircraft. Signals are received by GNSS receivers from multiple satellites orbiting the Earth and processed to determine the GNSS receiver's location and, by proxy, the location of the device, vehicle, etc.

BRIEF SUMMARY

Various examples are described for systems and methods for detecting and mitigating spoofed satellite navigation signals. One example method includes receiving a first set of global navigation satellite system (GNSS) information based on GNSS signals over a first period of time from a GNSS receiver; determining at least one GNSS signal is likely being spoofed based on a discrepancy associated with the first set of GNSS information; identifying a first location associated with a location determined based on the first set of GNSS signals prior to the likely spoofing of the at least one GNSS signal; receiving a second set of GNSS information based on GNSS signals over a second period of time from the GNSS receiver, the second period of time later than the first period of time; determining the spoofing has ceased based on the second set of GNSS information; determining a second location based on one or more locations determined after determining the spoofing has ceased; and determining a spoofing region based on the first and second locations.

An example method for determining a boundary of a spoofing region identifying spoofed satellite signals, according to this disclosure, may comprise determining, based on a first set of Global Navigation Satellite System (GNSS) signals received at a GNSS receiver over a first period of time, at least one GNSS signal corresponding to a GNSS satellite has experienced a first transition, wherein the first transition comprises a transition from a not spoofed state in which the at least one GNSS signal is not determined to be spoofed to a spoofed state in which the at least one GNSS signal is determined to be spoofed, or a transition from the spoofed state to the not spoofed state. The method also may comprise determining a first location corresponding to a location at which the GNSS receiver was located during the first transition.

An example method for compensating for spoofed satellite signals, according to this disclosure, may comprise obtaining, by a device, a geopolygon indicating a spoofing region, the spoofing region comprising a region in which at least one Global Navigation Satellite System (GNSS) signal corresponding to a GNSS satellite has been determined to be spoofed. The method also may comprise determining movement of the device into or within a threshold proximity to the spoofing region based on a determined location of the device and the geopolygon indicating the spoofing region. The method also may comprise responsive to determining the movement of the device into or within the threshold proximity to the spoofing region, adjusting a positioning unit of the device from a first configuration to a second configuration, wherein, while in the second configuration, the positioning unit is configured to disregard the at least one GNSS signal when determining a position estimate of the device. The method also may comprise determining, with the positioning unit, the position estimate of the device based on a first set of GNSS signals, excluding the at least one GNSS signal, received by the positioning unit while the positioning unit is in the second configuration.

An example device for determining a boundary of a spoofing region identifying spoofed satellite signals, according to this disclosure, may comprise a GNSS receiver, a memory, one or more processors communicatively coupled with the GNSS receiver and the memory, wherein the one or more processors are configured to determine, based on a first set of Global Navigation Satellite System (GNSS) signals received at the GNSS receiver over a first period of time, at least one GNSS signal corresponding to a GNSS satellite has experienced a first transition, wherein the first transition comprises a transition from a not spoofed state in which the at least one GNSS signal is not determined to be spoofed to a spoofed state in which the at least one GNSS signal is determined to be spoofed, or a transition from the spoofed state to the not spoofed state. The one or more processing units further may be configured to determine a first location corresponding to a location at which the device was located during the first transition.

An example device for compensating for spoofed satellite signals, according to this disclosure, may comprise a positioning unit, a memory, one or more processors communicatively coupled with the positioning unit and the memory, wherein the one or more processors are configured to obtain a geopolygon indicating a spoofing region, the spoofing region comprising a region in which at least one Global Navigation Satellite System (GNSS) signal corresponding to a GNSS satellite has been determined to be spoofed. The one or more processing units further may be configured to determine movement of the device into or within a threshold proximity to the spoofing region based on a determined location of the device and the geopolygon indicating the spoofing region. The one or more processing units further may be configured to responsive to determining the movement of the device into or within the threshold proximity to the spoofing region, adjust the positioning unit from a first configuration to a second configuration, wherein, while in the second configuration, the positioning unit is configured to disregard the at least one GNSS signal when determining a position estimate of the device. The one or more processing units further may be configured to determine, with the positioning unit, the position estimate of the device based on a first set of GNSS signals, excluding the at least one GNSS signal, received by the positioning unit while the positioning unit is in the second configuration.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 2A-2B show examples of GNSS spoofing;

FIG. 3 shows an example UE for detecting and mitigating spoofed satellite navigation signals;

DETAILED DESCRIPTION

Figure 1:
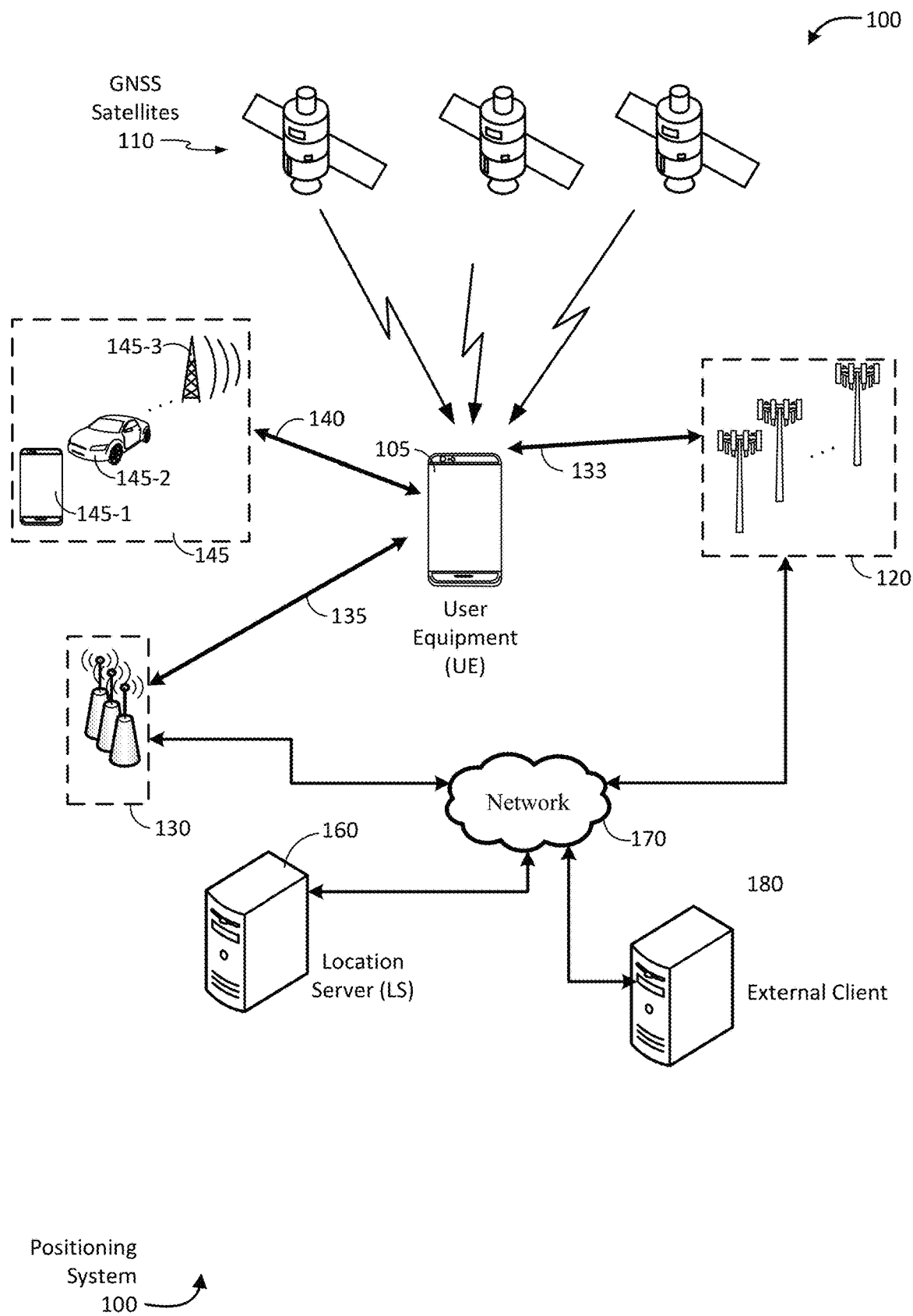
FIG. 1 shows an example system for detecting and mitigating spoofed satellite navigation signals.

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure or the spirit of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms mobile device and user equipment (UE) may be used interchangeably and are not intended to be specific or otherwise limited to any particular radio access technology (RAT), unless otherwise noted. In general, a mobile device and/or UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, vessel, aircraft motorcycle, bicycle, etc.), Internet of Things (IoT) device, etc.), or other electronic device that may be used for Global Navigation Satellite Systems (GNSS) positioning as described herein. According to some embodiments, a mobile device or UE may be used to communicate over a wireless communications network. A UE may be mobile or may (e.g., at certain times) be stationary, and may communicate with a radio access network (RAN). As used herein, the term UE may be referred to interchangeably as an access terminal or AT, a client device, a wireless device, a subscriber device, a subscriber terminal, a subscriber station, a user terminal (or UT), a mobile device, a mobile terminal, a mobile station, or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform ("e.g., included as part of a processing circuit or external to such a processing circuit"). Further, unless specifically stated otherwise, processes described herein, with reference to flow diagrams or otherwise, may also be executed and/or controlled, in whole or in part, by such a computing platform.

A "space vehicle" or "SV," as referred to herein, relates to an object that is capable of transmitting signals to receivers on the earth's surface. In one particular example, such a SV may comprise a geostationary satellite. Alternatively, a SV may comprise a satellite traveling in an orbit and moving relative to a stationary position on the earth. However, these are merely examples of SVs and claimed subject matter is not limited in these respects.

A "location," as referred to herein, relates to information associated with a whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects.

Location determination techniques described herein may be used for various wireless communication networks such as a wireless wide area network (WWAN), a wireless local area network (WLAN), a wireless personal area network (WPAN), and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named 3rd Generation Partnership Project (3GPP). Cdma2000 is described in documents from a consortium named 3rd Generation Partnership Project 2 (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain pseudorange measurements comprising approximations of distances between associated SVs and a navigation satellite receiver. In a particular example, such a pseudorange may be determined at a receiver that is capable of processing signals from one or more SVs as part of a GNSS (which may also be referred to as a Satellite Positioning System (SPS)). Examples of GNSS systems include Naystar Global Positioning System (GPS), established by the United States; Globalnaya Navigatsionnay Sputnikovaya Sistema, or Global Orbiting Navigation Satellite System (GLONASS), established by the Russian Federation and similar in concept to GPS; the BeiDou Navigation Satellite System (BDS) created by the Chinese; and Galileo, also similar to GPS but created by the European Community and slated for full operational capacity in the near future. To determine its position, a satellite navigation receiver may obtain pseudorange measurements to four or more satellites as well as their positions at time of transmitting. Knowing the SVs' orbital parameters, these positions can be calculated for any point in time. A pseudorange measurement may then be determined based, at least in part, on the time a signal travels from a SV to the receiver, multiplied by the speed of light. While techniques described herein may be provided as implementations of location determination in a GPS and/or Galileo types of SPS as specific illustrations according to particular examples, it should be understood that these techniques may also apply to other types of GNSS systems, and that claimed subject matter is not limited in this respect.

A GNSS as referred to herein relates to a navigation system comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. A SV which is a member of a particular GNSS constellation typically transmits navigation signals in a format that is unique to the particular GNSS format. Accordingly, techniques for acquiring a navigation signal transmitted by a SV in a first GNSS may be altered for acquiring a navigation signal transmitted by a SV in a second GNSS. In a particular example, although claimed subject matter is not limited in this respect, it should be understood that GPS, Galileo and GLONASS each represent a GNSS which is distinct from the other two named SPS. However, these are merely examples of SPS' associated with distinct GNSS' and claimed subject matter is not limited in this respect.

According to an embodiment, a navigation receiver may obtain a pseudorange measurement to a particular SV based, at least in part, on an acquisition of a signal from the particular SV which is encoded with a periodically repeating pseudo-noise (PN) (or pseudo-random-noise (PRN)) code sequence. Acquisition of such a signal may comprise detecting a "code phase" which is referenced to time and associated with a point in the PN code sequence. In one particular embodiment, for example, such a code phase may be referenced to a state of a locally generated clock signal and a particular chip in the PN code sequence. However, this is merely an example of how a code phase may be represented and claimed subject matter is not limited in this respect.

According to an embodiment, detection of a code phase may provide several ambiguous candidate pseudoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as the pseudorange measurement to the SV. As pointed out above, a navigation receiver may estimate its location based, at least in part, on pseudorange measurements obtained from multiple SVs.

As illustrated below according to a particular embodiment, a navigation receiver may acquire a first signal from a first SV to detect a code phase of the first signal. In acquiring a second signal from a second SV, a navigation receiver may search for a code phase over a limited code phase search range in the second signal based, at least in part, on the code phase of the acquired first signal. Accordingly, the code phase of the acquired first signal allows such a navigation receiver to acquire the second signal faster and/or using fewer processing resources.

Signals transmitted by GNSS SVs generally have very low signal strength (e.g., less than −120 dBm) by the time they arrive at a GNSS receiver. As a result, radio interference can overpower weak GNSS signals, causing satellite signal loss and potentially loss of positioning. However, malicious actors may take advantage of this effect to "spoof" GNSS signals, which may be used to send incorrect information in a competing signal that a GNSS navigation system then uses to determine navigational data or time data that is different than what would otherwise be determined based on true GNSS signals. Thus, spoofing is an intelligent form of interference which makes the receiver report false time and/or navigational information. This can cause vehicles that rely on GNSS navigation signals to stray off course, or in extreme cases, GNSS spoofing systems can take control of a navigation system and reroute a vehicle to an unintended location. Thus, spoofing systems can result in accidents or other mischief.

To address spoofing attacks, systems and methods according to this disclosure can detect potential GNSS spoofing and develop maps identifying regions in which spoofing has previously been detected. This information can then be used to alter the behavior of the GNSS receiver when it detects it is nearing a previously identified spoofing region or the output of the GNSS receiver may be ignored as long as the GNSS signal appears to be spoofed and an alternate positioning technique may be used.

As used herein, the term "spoofed state" may refer to a state of operation (e.g., for a GNSS receiver) in which a device operates when a determination is made (e.g., by the device or another device) that one or more GNSS signals are being spoofed. This may mean that a determination of whether spoofing is occurring has been made (e.g., exceeded a threshold likelihood or level of confidence) based on one or more techniques used to detect spoofing. As described elsewhere herein, such techniques may use information such as a discrepancy in one or more GNSS signals and/or a determination that the GNSS receiver is located in, or within a threshold proximity to, a region in which GNSS spoofing has been previously determined to occur (e.g., a spoofing region). Further, as used herein, the term "not spoofed state" may refer to a state of operation in which a device operates when (i) an affirmative determination is made that one or more GNSS signals are not being spoofed or are not likely being spoofed, and/or (ii) no determination has been made that one or more GNSS signals are being spoofed or are likely being spoofed. Thus, as described in more detail herein, a GNSS receiver may operate in a spoofed state when it is receiving GNSS information subject to at least one signal discrepancy caused by a spoofing transmitter, or "spoofer." Typically the discrepancy is one caused purposefully by a third party to confuse the receiver into producing an erroneous GNSS location. A spoofed state in the GNSS receiver may be identified by comparing the GNSS location against alternative sources of location or historical locations stored prior to the spoofing, comparing GNSS parameters such as time against maintained time or time from alternative sources, detecting jumps and/or anomalies in signal and/or positioning parameters such as frequency, pseudorange, or power, or in calculated location or by other means. In contrast, a GNSS receiver may operate in a not spoofed state when it is receiving GNSS signals from the GNSS constellation, rather than from a spoofing transmitter.

In an example embodiment, a car using GPS navigation may use information from the GPS system to provide turn-by-turn directions to the driver. But in this example, the information provided by the GPS receiver (e.g., operating in a not spoofed state) is also provided to spoof detection software. The spoof detection software receives signals from the GPS receiver that include data extracted from the GPS signals (such as location, heading, speed, time, date, etc.). In addition, the spoof detection software receives characteristics of the received GPS signals themselves (e.g., frequency, code phase, signal strength, etc.) from the GPS receiver, each referred to as a "signal characteristic" or "characteristic of the signal." The spoof detection software then monitors the data for discrepancies that may appear. Discrepancies may be a significant change in reported position without a corresponding change in speed or heading of the vehicle or may be based on a change in signal frequency or signal strength without a corresponding change in SV.

After detecting a discrepancy, the spoof detection software then uses a statistical model to determine the likelihood that the discrepancy is due to spoofing or due to some transient error or condition, e.g., recent system startup, multipath, passing under a bridge, etc. If the discrepancy is likely due to spoofing, the spoof detection software may immediately report potential spoofing or continue to monitor for a period of time to confirm the spoof detection.

If the spoof detection software confirms that spoofing is detected, it stores the last navigational data that it believes was generated by GPS signals received from GPS SVs (also referred to as "true" GPS or GNSS signals) rather than the spoofing transmitter. It continues to monitor the spoofed GPS data (e.g., in a spoofed state) until it determines that it has resumed receiving signals from the GPS SVs rather than the spoofing transmitter. To do so, it uses the statistical model based on then-currently received GPS signals (spoofed or true GPS signals) and on previously received GPS signal information known to be true GPS signals. In essence, the spoof detection software waits for the detected discrepancy (or discrepancies) to disappear. Once it determines that it is once again receiving true GPS signals, it stores the location determined by the first true GPS signals it receives. Thus, the spoof detection software marks the location at which spoofing began and the location where the spoofing ended.

In the case of two points, the spoof detection software can only form a line between the two points as indicating a spoofing region; however, if the line corresponds to travel down a street, it may be sufficient to determine a spoofing region. But over time, as the vehicle traverses the area, it may enter and exit spoofing regions multiple times. It may then associate different entry and exit points of spoofing regions based on their proximity to develop a two-dimensional (or three-dimensional, in the case of an aircraft) spoofing region.

The spoof detection software can maintain these spoofing regions, or it can report them to a remote server, e.g., a cloud-based server that crowdsources detected spoofing regions and use the spoofing regions to mitigate against the spoofing in the future. For example, the spoof detection software may adjust the configuration of the GPS receiver when it detects the vehicle enters a spoofing regions, such as by changing the frequency the GPS receiver uses to receive GPS signals. GPS SVs transmit GPS signals on multiple frequencies, and therefore, if the spoof transmitter is only transmitting on one frequency, true GPS signals may be received on a different frequency. Alternatively, the spoof detection software may instruct the vehicle to use an alternate positioning method, such as a different GNSS receiver or Wi-Fi or WWAN positioning, until the vehicle has left the spoofing region.

Example systems, devices, methods, and apparatuses according to this disclosure may be used to detect and map spoofing regions, store those spoofing regions locally or remotely, and use those spoofing regions (or any detected spoofing) to adjust positioning units to mitigate against any spoofed GNSS signals within the spoofing regions. Such systems may enable a positioning unit to be more resistant to spoofing attacks and to adjust to potential spoofing attacks without losing the ability to properly report position or to navigate safely. In addition, in systems that have positioning units with multiple different technologies, e.g., GNSS receivers, WWAN receivers, inertial sensors, etc., the system may enable power savings by deactivating or reducing a sampling rate of one or more of the positioning unit technologies while receiving true GNSS signals, and only activating (or increasing the sampling rate) these other positioning technologies when spoofing is detected or within a spoofing region.

These illustrative examples are given to introduce the reader to the general subject matter discussed herein and the disclosure is not limited to this example. The following sections describe various additional non-limiting examples and examples of systems and methods for detecting and mitigating spoofed satellite navigation signals.

FIG. 1 is a simplified illustration of a positioning system 100 in which a UE 105, location server (LS) 160, and/or other components of the positioning system 100 can use the techniques provided herein for determining and estimated location of UE 105, according to an embodiment. The techniques described herein may be implemented by one or more components of the positioning system 100. The positioning system 100 can include a UE 105, one or more satellites (also referred to as space vehicles (SVs)) 110 for a GNSS such as GPS, base stations 120, access points (APs) 130, location server (LS) 160, network 170, and an external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals.

In this example, FIG. 1 illustrates the UE 105 as a smartphone device, however, UEs may be any suitable device that includes GNSS capabilities or may be a device or machine with such GNSS functionality integrated into it. Thus, a UE 105 may include personal devices such as a smartphone, smartwatch, tablet, laptop, etc. However, UEs may include a larger class of device as well and may include vehicles with integrated GNSS receivers and positioning systems, such as boats or ships, cars, trucks, aircraft, etc.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the 3rd Generation Partnership Project (3GPP). Network 170 may also include more than one network and/or more than one type of network.

The base stations (BS) 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

As previously noted, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. As illustrated, other UEs may include, for example, a mobile phone 145-1, vehicle 145-2, and/or static communication/positioning device 145-3. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

According to some embodiments, such as when the UE 105 comprises and/or is incorporated into a vehicle, a form of D2D communication used by the UE 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units, or RSUs), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that UEs 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

Figure 2A:
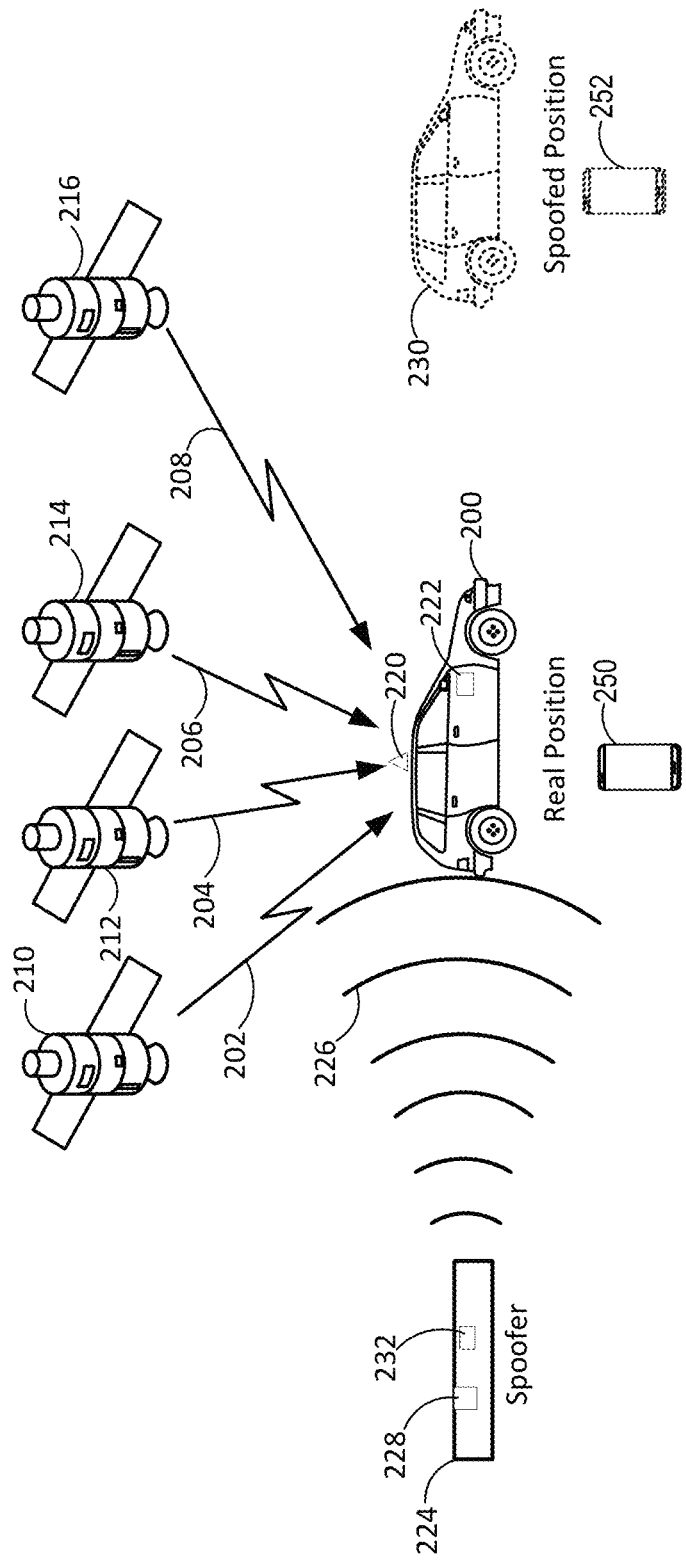

FIG. 2A is a diagram that depicts a situation where a vehicle 200 using GNSS navigation is receiving false GNSS satellite signals, i.e., it illustrates an example of spoofing. Vehicle 200 receives real GNSS satellite signals 202, 204, 206, and 208 from a plurality of GNSS satellites 210, 212, 214, and 216, respectively. GNSS satellite signals 202, 204, 206, and 208 are received by antenna 220 which is attached to the vehicle 200. GNSS receiver 222, which is electrically connected to antenna 220, receives signals 202, 204, 206, and 208, and computes the GNSS location coordinates of a location based on measurements of ranging information contained within signals 202, 204, 206, and 208. Vehicle 200 in various embodiments can include a navigation system and possibly a self-driving system that drives the vehicle 200 over a prescribed course using the computed GNSS coordinates of the location of the vehicle 200. It is to be understood that while antenna 220 is shown receiving GNSS satellite signals 202, 204, 206, and 208 from four GNSS satellites 210, 212, 214, and 216, antenna 220 can be receiving GNSS satellite signals from any number of GNSS satellites. Antenna 220 receives GNSS satellite signals from a plurality of GNSS satellites, where a plurality is any number greater than one.

FIG. 2A also depicts a spoofer 224. The spoofer 224 can include an antenna 228 and transmitter 232. The spoofer 224 can generate a wireless spoofing signal 226 that is received by the vehicle antenna 220. Spoofing signal 226 can be a composite signal which contains a plurality of false GNSS satellite signals. Spoofing signal 226 can be generated so as to mimic real GNSS satellite signals. In various embodiments, the spoofer 224 is located at a fixed geographic location. In some embodiments, the spoofer 224 can be configured to be mobile (e.g., attached to another vehicle or vessel).

GNSS signal spoofer 224 can be designed to create false GNSS satellite signals in several ways. In some embodiments spoofer 224 creates spoofing signal 226 by simulating real GNSS satellite signals programmed with the desired false satellite data. In FIG. 2A, the spoofer 224 captures real GNSS signals 202, 204, 206, 208 at an antenna 228, and then rebroadcasts these signals with a transmitter 232. In the embodiment shown in FIG. 2A, spoofer 224 creates spoofing signal 226 by re-broadcasting live GNSS signals received at a location different from the GNSS navigational system that is to be spoofed. It is to be understood that spoofer 224 can create and broadcast spoofing signal 226 using any method that creates a spoofing signal 226 that includes data meant to be accepted as real GNSS signals. The spoofer 224 or multiple spoofers 224 may simulate stationary or moving locations as well. For example, some spoofers 224 can simulate a location that moves in a circle around a geographic area.

In the embodiment shown in FIG. 2A, the spoofer 224 can includes an antenna 228 and a transmitter 232. Spoofer 224 generates spoofing signal 226 by re-broadcasting GNSS satellite signals 202, 204, 206, and 208 received at spoof antenna from live GNSS satellites 210, 212, 214, and 216. Satellites 210, 212, 214, and 216, can be the same or different GNSS satellites as satellites 210, 212, 214, and 216. Spoofing antenna 228 can be located at spoof location that is offset from the real vehicle 200 location. Real GNSS satellite signals 202, 204, 206, and 208 are combined into composite spoofing signal 226 and rebroadcast by a spoofing transmitter 232.

The spoofing signal 226 can be a composite of a plurality of GNSS satellite signals 202, 204, 206, and 208, as received by antenna 220. When GNSS satellite signals 202, 204, 206, and 208 are rebroadcast from the spoofer transmitter, they become false GNSS satellite signals because they contain data as received by the spoofer antenna 228 at a different location from the real position resulting in a spoofed position 230. Spoofing signal 226 can contains any number of false GNSS satellite signals.

The power level of spoofing signal 226 can be set such that when spoofing signal 226 is received by antenna 220, spoofing signal 226 overpowers real GNSS satellite signals 202, 204, 206, and 208. Consequently receiver 222 uses spoofing signal 226 to compute a GNSS location based on false GNSS satellite signal 226. Specifically, receiver 222 will measure the GNSS satellite signal phase (code phase and/or carrier phase) φ values of false GNSS satellite signals 226, will use the code phase and/or the carrier phase φ values to compute GNSS location coordinates for a different location other than the true location, and will report that vehicle is at different location instead of its true location. This is the intent of spoofer 224 in some embodiments—to make receiver 222 believe, and report, that vehicle 200 is at false location, spoofed position 230 that is offset relative to real position. Spoofing of a navigational system can also be performed in order to make a navigational device provide false timing data. In addition, GNSS devices may be used in critical timing applications. Thus in some embodiments detection of false GNSS satellite signals is performed to prevent a spoofing system from causing false timing data to be provided by a GNSS device.

FIG. 2B is a diagram of an overhead view of a portion of street system 250, illustrating how a spoofer may impact a vehicle travelling on a road system, according to an example. The street system 250 includes overlaid reported locations of a vehicle that traveled along first street 252 and made a right turn on to main street 251. The path of the vehicle is shown as it entered an area 260 with a spoofer transmitting a spoofed GNSS signal. The spoofed GNSS signal provides information indicating that the vehicle is actually in the spoofed false zone 270 near the intersection of hill street 253 and second street 254. Thus, as the vehicle entered the area covered by the spoofer, its GNSS receiver reported locations in the spoofed false zone. When the vehicle left the spoofed zone 260, it resumed reporting its true position. If the vehicle were an autonomously piloted vehicle relying on GNSS locations, it may have taken unpredictable or dangerous actions upon receiving the spoofed location data from the spoofer. The impact may be less severe is the vehicle is manually controlled and the GNSS is simply used for computer generated directions to the driver. However, in either case, the proper navigation of the vehicle may have been compromised.

Referring now to FIG. 3, FIG. 3 shows an example UE 300 for detecting and mitigating spoofed satellite navigation signals. The UE 300 includes spoof detection software 310 and associated data store 312 and a positioning unit 320 that includes one or more GNSS receivers 322, one or more WWAN subsystems 324, one of more Wi-Fi subsystems 326, and an inertial positioning unit 328 with one or more inertial sensors. Each of the WWAN subsystem 324, Wi-Fi subsystem(s) 326, and the inertial positioning units 328 may be capable of determining the location of the UE 300, in addition to the GNSS receiver 322; however, the UE may be primarily reliant on the GNSS receiver 322 for positioning.

Figure 8:
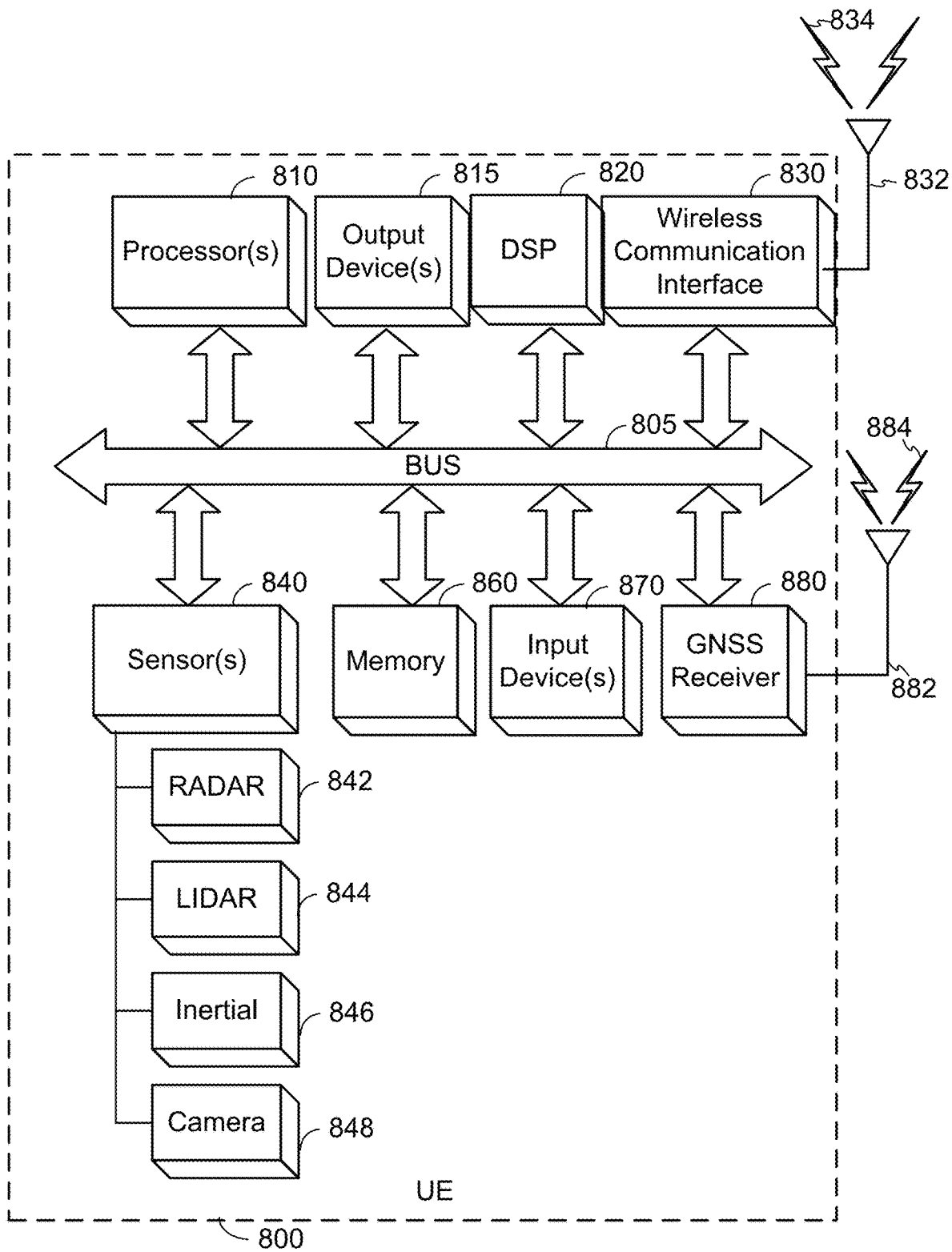
FIG. 8 shows an example of a UE for detecting and mitigating spoofed satellite navigation signals.

It can be noted that the UE 300 may comprise additional components (not shown), and may be integrated into a larger device, such as a vehicle, vessel, computer system, or the like. Moreover, some or all of the components of the UE 300 may be executed by various hardware and/or software components of the UE as illustrated in FIG. 8 and described hereafter. As such, hardware and/or software components illustrated in FIG. 3 may overlap with hardware and/or software components illustrated in FIG. 8.

WWAN subsystem 324 and/or Wi-Fi subsystem 326 may provide position determination of a UE 300 using any of a variety of wireless techniques, which may involve transmitting and/or receiving wireless signals to and/or from Wi-Fi access points (e.g., APs 130 of FIG. 1), base stations of a WWAN (e.g., base stations 120 of FIG. 1), and/or other UEs (e.g., UEs 145 of FIG. 1, which may include one or more V2X devices such as vehicles, RS use, etc.). Moreover, such positioning may further involve communicating with a location server (e.g., location server 160) as described previously with regard to FIG. 1. As such, WWAN subsystem 324 and/or Wi-Fi subsystem 326 may comprise and/or be integrated into a wireless communication interface which, (as described below with regard to item 830 in FIG. 8) may comprise one or more transceivers for wireless communication and/or positioning. Positioning procedures and methods performed using the WWAN subsystem 324 and/or Wi-Fi subsystem 326 may comprise UE-assisted/UE-based and/or network-based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods.

In the UE 300 of FIG. 3, the spoof detection software 310 receives information from the positioning unit 320, such as information from a GNSS receiver 322, accesses the data store 312 to obtain information about one or more spoofing regions, wirelessly accesses one or more remote servers to obtain spoofing regions or send information about spoofing regions, determines whether one or more GNSS signals are likely being spoofed, and, if spoofing is likely, adjusts a configuration of the positioning unit 320, and update spoofing information in the data store 312 or at the one or more remote servers.

The GNSS receiver 322 receives GNSS signals from multiple GNSS SVs as discussed above with respect to FIGS. 1-2 and determines navigational data based on the received signals. In addition, the GNSS receiver 322 determines characteristics of the received GNSS signals, such as frequency, code phase, signal strength, etc. The GNSS receiver 322 then transmits GNSS information to the spoof detection software 310.

The GNSS information may include navigational data, such as latitude, longitude, altitude, heading, speed, time information, navigation message data (e.g., ephemeris or almanac), etc. The GNSS information may also include GNSS status data, such as the number of visible satellites, almanac information, ephemeris information, etc., and characteristics of the received GNSS signals, such as frequency, carrier phase, code phase, signal strength, etc. The time information may include any time-related information, such as date, time of day, number of leap seconds, etc. Thus, the GNSS receiver 322 may report a significant amount of GNSS information to the spoof detection software 322, which may then analyze the received GNSS information and use it to detect potentially discrepancies in received GNSS signals over time.

As a part of detecting GNSS spoofing, the spoof detection software 310 analyzes GNSS information received over time from successive GNSS signals to identify abnormal changes in the GNSS information. For example, the GNSS receiver's reported position may change abruptly by a significant distance for a particular reported speed. If the GNSS receiver is integrated into a vehicle's navigation system and the vehicle is travelling 25 meters per second (m/s), if the GNSS information received by the spoof detection software indicates a change in location of 150 meters over two seconds, but without a corresponding change in speed from 25 m/s to 75 m/s, the spoof detection software 322 may identify a discrepancy from the GNSS information.

However, location discrepancies are only one example of many discrepancies that may be detected. These discrepancies can be detected, accumulated, and used by the spoof detection software to determine whether a GNSS signal is being spoofed. Different example GNSS receivers may output GNSS information in different manners, however, in one example, the GNSS receiver reports new GNSS information once per second (each referred to as a "sample" or "epoch"), which may be transmitted to the spoof detection software 322, a navigation system, etc. Thus, successive signals from the GNSS receiver may be expected to transmit GNSS information with data that changes over time; however, the way that the GNSS information changes over time may indicate one or more discrepancies. Abrupt changes in location, speed, heading or other navigational data may all indicate a discrepancy. But changes in GNSS status data may indicate a discrepancy as well. For example, code phase may change abruptly from one sample to the next, or signal strength may increase significantly in a short period of time, e.g., one to a few samples. Similarly, ephemeris or almanac data, some of which simply includes repeating data, may change unexpectedly, or time information may change, such as the number of leap seconds reported by the GNSS.

Detecting a discrepancy may involve detecting a change in a value that, statistically, is outside the range of an expected change. For example, location values change over time as a GNSS receiver moves, but large changes in location that do not correspond to other data values, such as speed or heading, could be identified as a discrepancy. Similarly, changes in other kinds of data may indicate a discrepancy, such as changes in GNSS signal strength, code phase, etc. To help identify discrepancies, one or more statistics may be computed and tracked over time for at least some of the GNSS information. For example, when the GNSS receiver is first powered on, it may look for GNSS signals to lock onto and, once a lock is achieved on a sufficient number of SVs, it will start reporting GNSS information. Statistical analysis may begin at such a time and may continue indefinitely. Alternatively, statistics may be computed on a rolling historical window of GNSS information, e.g., a 30-minute window (or a window of 5, 10, 15, 20, 45, or 60 minutes, etc.) before a then-current sample.

As new GNSS information is received, it may be modeled based on the previously computed statistical information to determine whether it is a statistical outlier, or it is an acceptable value. Any suitable type of statistical modelling may be used, including computing values such as mean, standard deviation, etc. Further, statistics may be computed on data derivative of the GNSS information. For example, location information may change over time, thus, statistics related to the computed location (e.g., (latitude, longitude), may not be useful, but statistics related to changes in location (e.g., Δ latitude, Δ longitude), may be useful. Still other kinds derivative information may be calculated and modeled over time.

Some types of information may not require modeling but may instead directly indicate a discrepancy. For example, some GNSS information may be generally constant for long periods of time. Thus, changes in such GNSS information may directly indicate a discrepancy. One example may be the almanac data in the GPS system, which may only change a few times a year. If almanac data for a particular SV is received that differs from previously received almanac data for that SV or from almanac data received from another SV, it may be identified as a discrepancy. For if almanac data differs between two SVs, but has the same time stamp, it may indicate a discrepancy. Still other kinds of data may directly indicate a discrepancy. For example, acceleration of the GNSS receiver may be computed from GNSS location information, e.g., as the second derivative of location. If the GNSS receiver experiences a sudden change in location, e.g., a change in 200 meters in one sample, it would necessitate a very high velocity, which would then imply a very significant rate of acceleration from a previous speed. Acceleration over a predetermined threshold may be identified as a discrepancy. Similarly, thresholds may be set for any suitable GNSS information or derivative information computed from such GNSS information to determine a discrepancy.

Some examples according to this disclosure may employ statistical modelling to detect discrepancies, and some may employ predetermined thresholds, while some may employ both techniques. Further, because different GNSS systems may result in different kinds of GNSS information being received or reported by a GNSS receiver, different examples according to this disclosure may employ analysis of different types of GNSS information to identify potential discrepancies. Further, some examples, may only analyze a subset of the GNSS information while some may analyze all of the available GNSS information to identify discrepancies.

In addition to analyzing the GNSS information itself, the GNSS information may also be analyzed with respect to data from other components of a positioning unit. For example, GNSS location or heading information may be compared against location or heading information obtained from another positioning subsystem, such as a WWAN subsystem 324 or from an inertial positioning unit 328. And while discrepancies between GNSS location or heading information and similar information obtained from other positioning subsystems 324-328 may occur without GNSS spoofing, abrupt changes in such discrepancies may be detected and identified as potential discrepancies. Thus, discrepancies may be detected within the GNSS information as discussed above, as well as discrepancies associated with the GNSS information, such as based on information received from other positioning subsystems 324-328.

As discussed above, the spoof detection software 310 analyzes GNSS information for discrepancies to help identify potential GNSS spoofing. However, determining spoofing is occurring may involve additional processing beyond identifying discrepancies. For example, if a discrepancy is identified in only one data value in received GNSS information, it may not indicate spoofing but a corruption of the received GNSS signals, e.g., due to interference. Thus, the spoof detection software 310 may perform additional analysis in addition to identifying discrepancies in GNSS information to detect spoofing.

In this example, the spoof detection software 310 may use a statistical model that accepts as input multiple different kinds of data, including detected inconsistencies, to determine whether a received GNSS signal is likely being spoofed or not. The spoof detection software 310 may receive, as input, the detected inconsistencies as well as information about known spoof regions, information from other available sensors or systems that are part of a larger positioning component within the UE 300, and information about the type of movement the device is experiencing, e.g., the UE is being carried by a pedestrian versus being integrated within a car or truck versus being integrated within a ship versus being integrated within an aircraft, etc. The statistical model may receive, as input, data from these different sources, and may determine a likelihood that a GNSS signal is being spoofed.

In this example, the spoof detection software may employ a Bayesian model to determine a likelihood, e.g., between 0 and 1, that the received GNSS signals are true GNSS signals based on the received input data. Thus, in this example, whether received GNSS signals are determined as likely true GNSS signals may not be a binary decision based on whether one or more discrepancies were detected. Instead, the model may analyze incoming data and, over time and successive data samples, it may tend to indicate whether the received signals are true GNSS signals or spoofed signals. Thus, immediately after the UE is powered on and begins receiving GNSS information from the GNSS receiver, the Bayesian model starts at an initial state, e.g., it assumes a 50% chance of spoofing and outputs a value of 0.5, and over time, its computed probability increases or decreases as more GNSS information or other input information is received, as known spoof regions are entered or exited, etc.

It should be appreciated that in this example, the spoof detection software 310 determines a likelihood of spoofing as new data is received, e.g., after each GNSS sample is received. Thus, the spoof detection software 310 may output a series of probabilities over time regarding whether a GNSS signal is being spoofed. This data may be stored in one or more records in the data store 312 along with other information, such as received GNSS information, time stamp information, location information, etc. Thus, over time, the spoof detection software 310 may generate a database of records having locations and corresponding determined probabilities of spoofing. These records may then be used to identify spoofing regions.

To identify spoofing regions, the spoof detection software 310 may generate records of probabilities of spoofing associated with determined locations. As the probabilities are generated, the probabilities may change from indicating no spoofing to indicating GNSS spoofing. These kinds of changes may indicate entry into a spoofing region (or exiting from such a spoofing region). Further, because the spoof detection software 310 may generate new probabilities with each GNSS sample, or one another regular basis, it may also identify transitions from locations with a high probability of true GNSS signals to a location with a high probability of spoofed GNSS signals, thereby detecting entry into (or exit from) a spoofing region relatively quickly.

The spoof detection software 310 may identify these transitions as entry points into a spoofing region (or, conversely, exit points, if the probability transitions from a high probability of spoofed GNSS signals to a high probability of true GNSS signals). Locations corresponding to transitions (referred to herein as "transition locations") may be stored separately from other data records, or they may be stored instead of data records that do not indicate a transition. However, the transition locations may then be used to identify boundaries to spoofing regions and thus to determine spoofing regions that may be used in the future to help determine whether GNSS spoofing is occurring. To enable such functionality, the two transition locations corresponding to the entry and exit points may be associated as representing an apparent boundary of a spoofing region, which will be explained in more detail below.

A spoofing region is a region near a transmitter that is transmitting a counterfeit GNSS signal that spoofs a true GNSS signal such that the counterfeit GNSS signal may be received instead of a true GNSS signal. Identifying the location of spoofing regions may assist future spoof detection operations and may facilitate configuration changes to a positioning unit, e.g., positioning unit 320, to adjust the positioning unit to output accurate position information rather than positions based on the spoofed GNSS signals.

To identify a spoofing region in this example, transition locations may be identified and stored in the data store 312. In some cases, a spoofing region may be identified by two transition locations, but the reliability and utility of such spoofing regions may be limited. For example, a spoofing region based on two transition locations may be defined as a line between the two transition locations, which may correspond to a street or a direction of travel on a street. Or a spoofing region could be generated by assuming the two transition locations are end points on the diameter of a circle or a sphere. However, in this example, the spoof detection software 310 may generate spoofing regions using two-dimension or three-dimensional "geopolygons."

A geopolygon is a region (e.g., area) defined by three or more transition locations (a three-dimensional geopolygon, e.g., for air travel, may use at least four transition locations to define a region comprising a volume). Thus, as transition locations are accumulated, the spoof detection software 310 groups the transition locations based on relative proximity. In some examples, the transition locations may also be grouped based on the nature of one or more identified discrepancies. Such a technique may help distinguish between nearby, but different, spoofing regions that employ different spoofed GNSS signals.

Figure 4A:
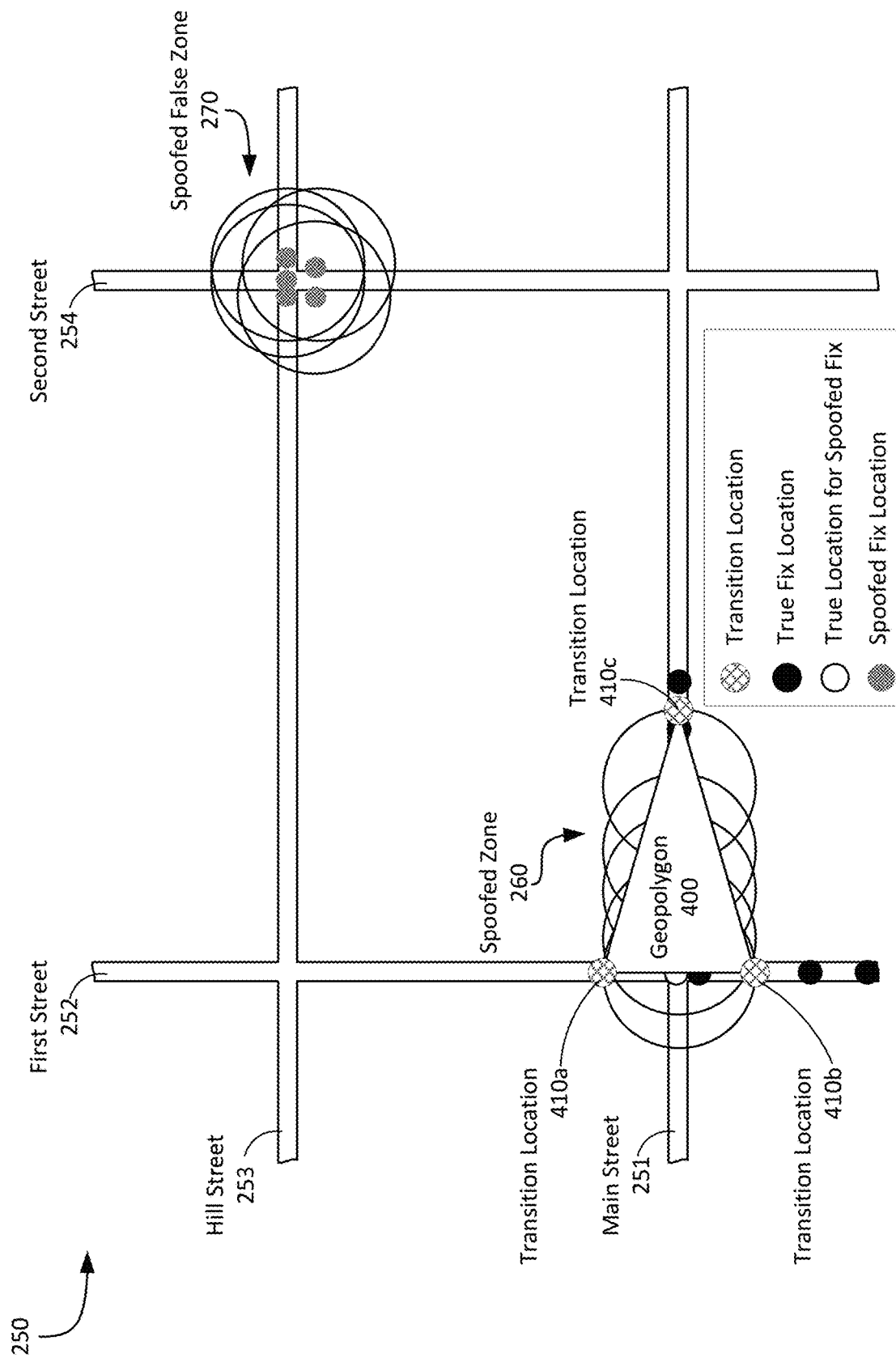
FIGS. 4A-4B show examples of geopolygons for detecting and mitigating spoofed satellite navigation signals.
Figure 4B:
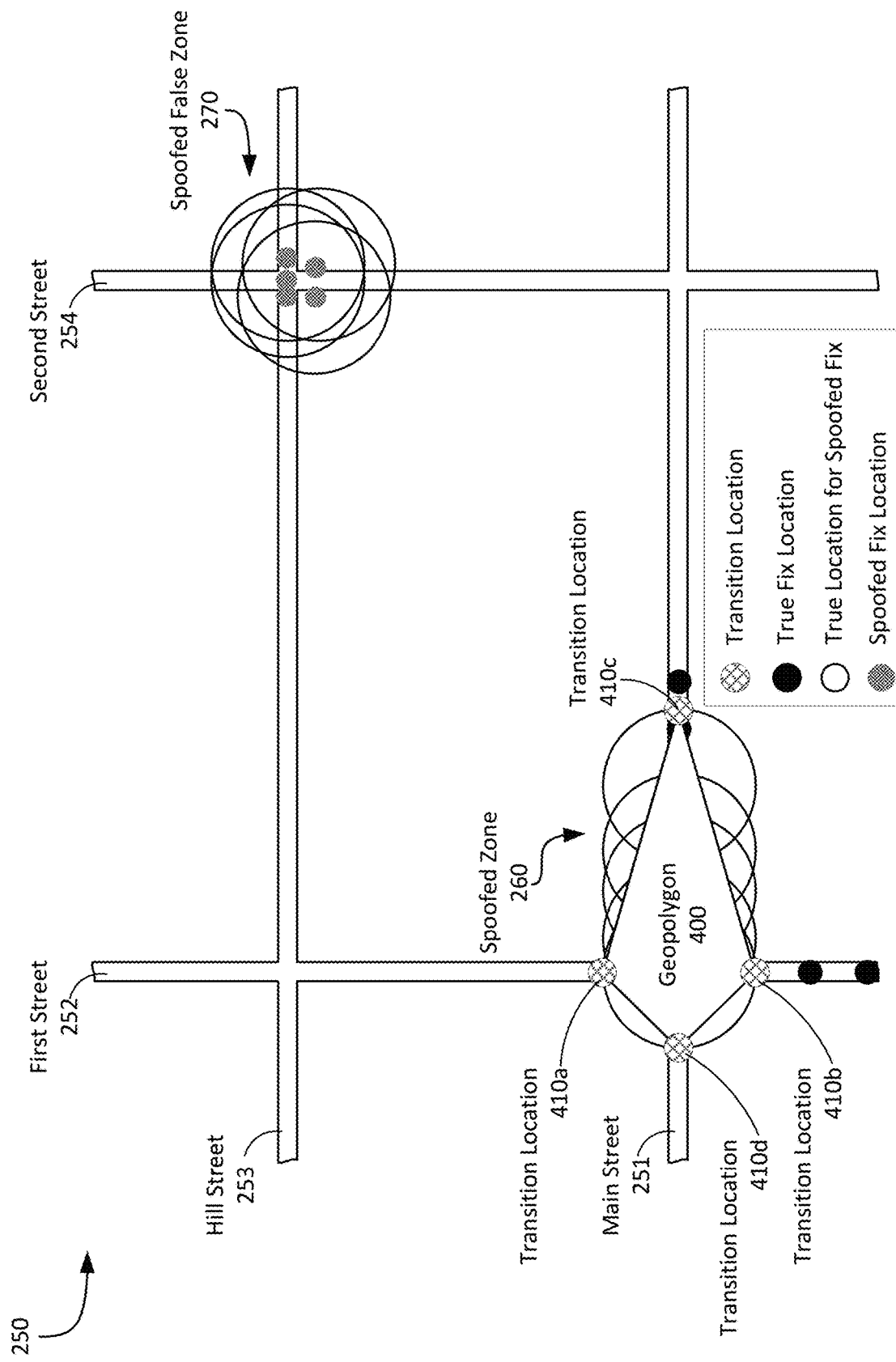

Referring to FIG. 4A, FIG. 4A illustrates an example of a geopolygon generated based on the example shown in FIG. 2B. As discussed above with respect to FIG. 2B, the spoofed zone 260 has a spoofer transmitter that outputs a spoofed GNSS signal providing locations corresponding to the spoofed zone 270. As a vehicle (or vehicles) traverse the spoofed zone 260, they detect transition locations 410*a-c* where spoof detection software 310 detects a change from a low probability of spoofing to a high probability of spoofing (or the reverse). The locations of these transitions are stored and associated to determine vertices of a geopolygons 400. In this example, three transition locations 410*a-c* have been identified, creating a triangular geopolygons 400. However, if more transition locations are identified, the geopolygon 400 may change shape. FIG. 4B illustrates the geopolygons 400 after a fourth transition location 410*d* has been determined and associated with the geopolygon 400. Thus, as more transition locations, the geopolygons 400 may change shape to accommodate additional vertices.

Referring again to FIG. 3, as the UE 300 traverses a region, it may encounter various GNSS spoofers and log transition locations associated with each spoofer. However, to generate a geopolygon, the UE 300 may identify three transition locations associated with the same spoofer. Thus, the UE 300 may detect the same GNSS spoofer on a second occasion and at a different location than the two previous transition locations. This may occur naturally when a vehicle comprising the UE 300 traverses a street in one direction and encounters a spoofed signal and subsequently traverses the street in the opposite direction and encounters the same spoofed signal. In such a scenario, the spoof detection software 310 may detect four transition locations. After detecting these transition locations, it may first associate the two transition locations that represented the first entry and exit (transition locations 1 and 2) from the apparent spoofing region and may also associate the two transition locations that represented the second entry and exit (transition locations 3 and 4) from the apparent spoofing location. Thus, the spoof detection software 310 may have four transition locations but may not yet have associated all four transition locations with each other, despite pairs of transition locations being associated.

To associate unassociated transition locations, the spoof detection software 310 may determine the distance between the unassociated transition locations. If one unassociated transition location, e.g., transition location 1, is sufficiently close to another transition location, e.g., transition location 3, the spoof detection software 310 may associate those two transition locations. This may, in turn, cause all four transition locations to be associated with each other: transition locations 1 and 2 were previously associated, transition locations 3 and 4 were previously associated, and now transition locations 1 and 3 are associated, thus linking all four transition locations 1, 2, 3, and 4.

Another technique to associate transition locations may be to determine whether lines intersecting one associated pair of transition locations intersects another associated pair of transition locations. For example, the UE 300 traverses an intersection, e.g., as shown in FIG. 4B, in one direction and detects entry into and exit from a spoofing region (e.g., spoofed zone 260), and then traverses the same intersection while on a different street, e.g., orthogonally to the prior traversal, two pairs of transition locations may be generated, e.g., transition points 410*a-b* and 410*c-d*. However, respective line segments connecting the two pairs of transition locations will intersect (corresponding to the middle of the intersection), potentially indicating the transition locations are all related to the same spoofing region.

After the spoof detection software has associated at least three transition locations, it may then generate a geopolygon to represent the spoof region. The three or more associated transition locations then form vertices on the geopolygon and define the interior region of the spoofing region. Additional information about the geopolygon may also be generated, such as a center or centroid of the geopolygons using any suitable mathematical technique (e.g., geometric analysis) to enable efficient identification of nearby spoofing zones based on location information. The geopolygon may then be stored in the data store 312. As additional transition locations are identified, the spoof detection software 310 may associate them with existing transition locations or geopolygons and use them to adjust the boundaries of existing geopolygons or define new geopolygons. For example, the spoofing region 400 in FIG. 4A is augmented in FIG. 4B with a fourth transition location.

In addition to (or instead of) storing transition locations or geopolygons in the data store 312, the spoof detection software 310 may transmit transition location information or geopolygon information to a remote server for storage and subsequent access.

Figure 5:
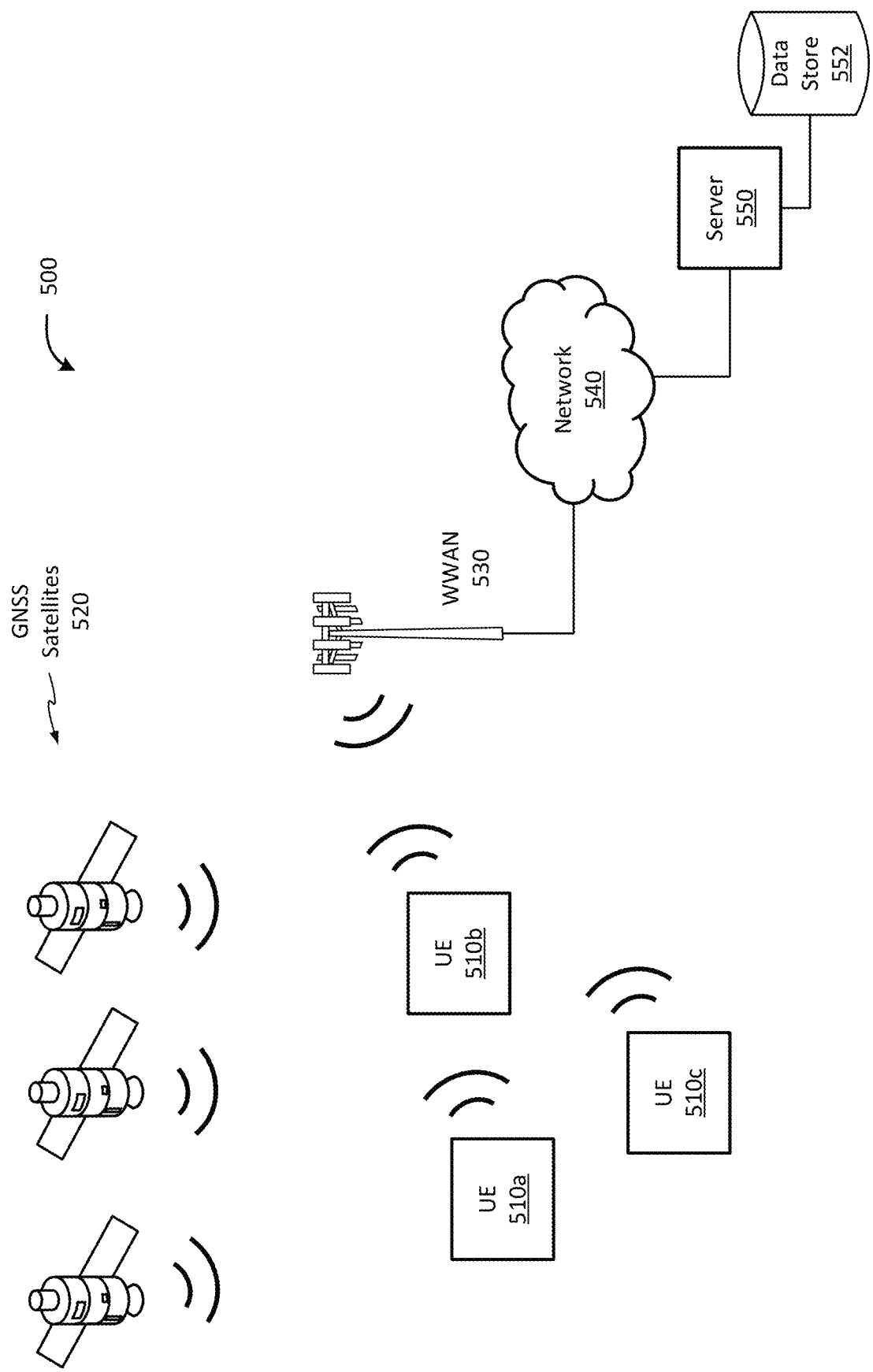
FIG. 5 shows an example crowdsourcing system for detecting and mitigating spoofed satellite navigation signals.

FIG. 5 illustrates an example crowdsourcing system 500 that enables UEs 510*a-c* to transmit transition location or geopolygon information to a remote server 550 or receive such information from the remote server 550. The use of a remote (or "cloud") server to receive and store such information may enable aggregation of transition locations and geopolygons from multiple different UEs 510*a-c*. This aggregated data may be used to generate a map of spoofing regions within a geographic region, or to better define the boundaries of geopolygons by using data gathered from a large population of UEs. And while the example shown in FIG. 5 only includes three UEs 510*a-c*, any number of UEs may be employed in some examples.

The example crowdsourcing system 500 shown in FIG. 5 includes multiple UEs 510*a-c* that receive signals from a constellation of GNSS satellites 520, generally as described above with respect to FIG. 1. UEs 510*a-c* are also in communication with a WWAN 530 (represented in FIG. 5 is a single base station, for simplicity), which enables access to network 540 and communications with server 550. It should be appreciated that the UEs 510*a-c* may be dispersed over a wide geographic area and each may communicate with a different WWAN 530 and/or WWAN 530 comprises at least a portion of the network 540 (which may comprise server 550 and/or data store 552), but each may ultimately be in communication with the server 550 through a communications network similar to that shown in FIG. 5. Further, while one server 550 is illustrated, any suitable number of servers 550 may be employed.

In addition to transmitting transition location information or geopolygon information, the spoof detection software 310 may transmit other information associated with such transition location or geopolygon information. For example, it may transmit GNSS information associated with such transition location or geopolygon information. Upon receiving such information, the server 550 may store it within its data store 552. In addition, the server 550 may use the received information to update its own statistical model(s), which it may use to detect false positives in the transition location information or detect other spoofing regions not detected by the spoof detection software 310.

To enable such functionality, the server 550 may employ a version of spoof detection software, e.g., spoof detection software 310, that uses the received information from the various UEs 510a-c and analyzes the GNSS information for discrepancies and determine probabilities that one or more GNSS signals is being spoofed based on models similar to those used by the various UEs. However, because the server receives information from a large number of UEs, its models may be better trained to detect discrepancies and determine spoofing of GNSS signals. In some such examples, the UEs 510a-c may simply report GNSS information as well as other data to the remote server 550 rather than executing its own spoof detection software. Thus, the remote server 550 may perform such processing and provide information to the UEs regarding any detected spoofing or spoofing regions, as well as any adjustments to be made to the UE's positioning unit, as will be discussed in more detail below.

Such a crowdsourcing system 500 may also allow aggregation of spoofing information, e.g., transition locations or spoofing regions, based on information received from multiple UEs 510a-c as discussed above. At a later time, one or more UEs 510a-c may retrieve spoofing data from the server 550, e.g., using WWAN 530. The spoofing data may include spoofing regions and corresponding transition locations or centers/centroids of the region. Other associated information may be provided, such as the number of times the spoofing region has been detected, how many different UEs have detected the spoofing region, which signals are spoofed, times of day when the signals are spoofed, etc. Further, UEs may further update such spoof data, such as by reporting detected transition locations, how many times the UE has entered the spoofing region (irrespective of whether the UE detected spoofing or not), whether spoofing was detected in a particular spoofing region, the times of day spoofing was detected (or not detected), etc. Using such information the server 550 may store spoofing data that is up-to-date and changes over time as UEs report spoofing information.

Further, the server 550 can provide such information to UEs based on requests received from the UEs, e.g., by providing spoofing data based on the UEs location, or it can automatically push information to a UE at particular intervals or as the UE moves within a geographic region. For example, the UE may receive the spoofing regions from the server 550, or the UE may receive transition locations from the server and determine a spoofing region based on the received transition locations.

Referring again to FIG. 3, the spoof detection software 310 may also request or retrieve spoof region information from a remote server, e.g., server 550. For example, on startup, the UE 300 may execute the spoof detection software 310, which may then transmit a request to the remote server for geopolygons to the server. Such a request may include the UE's then-current position, which may enable the remote server to identify geopolygons within a threshold distance (e.g., a 25-mile radius) of the UE 300 and provide the associated geopolygons information to the UE 300.

In addition to identifying discrepancies in the GNSS information and determining spoofing regions, the spoof detection software 310 may mitigate effects of detected GNSS spoofing. For example, the UE 300 in FIG. 3 employs a positioning unit that has multiple different sources of position information, including WWAN subsystem 324, Wi-Fi subsystem 326, and an inertial positioning subsystem 328. If the spoof detection software 310 determines that a GNSS signal is likely being spoofed, it may adjust a configuration of the positioning unit 320 to mitigate the spoofing. For example, the spoof detection software 310 may adjust the configuration of the positioning unit to use positioning information from one or more of the other available positioning subsystems 324, 326, 328. Thus, the UE 300 can switch to a different positioning subsystem while the GNSS signal appears to be spoofed. In some examples, the GNSS receiver 322 may be adjusted to receive a GNSS signal on a different frequency. For example, some GNSS systems may transmit GNSS information on multiple different channels. For example, GPS uses two different channels referred to as L1 and L5 to provide GPS information. If one of these channels is being spoofed, the spoof detection software 310 could reconfigure a GPS receiver to receive signals using the other channel (or both channels to detect when the spoofing ends).

Mitigation of spoofed GNSS signals may also involve activating inactive positioning subsystems 324-328 or increasing a sampling rate from those positioning subsystems 324-328. For example, to reduce power consumption, inertial sensors, e.g., accelerometers, gyroscopes, etc., may be deactivated or sampled at a low rate. However, if GNSS spoofing is determined to be occurring, the spoof detection software 310 could adjust the configuration of the positioning unit 320 to activate the inertial sensors or to increase a sampling rate, e.g., from 1 Hz to 1000 Hz. The UE 300 may then rely on data from the other positioning subsystems 324-328 until the GNSS spoofing has ended and the spoof detection software 310 could revert the positioning unit 320 to its prior configuration, e.g., by deactivating the inertial subsystem 328 or reducing its sampling rate. Thus, the spoof detection software 310 may enable the UE 300 to continue receiving accurate position information, even when it is located within a spoofing region.

Figure 6:
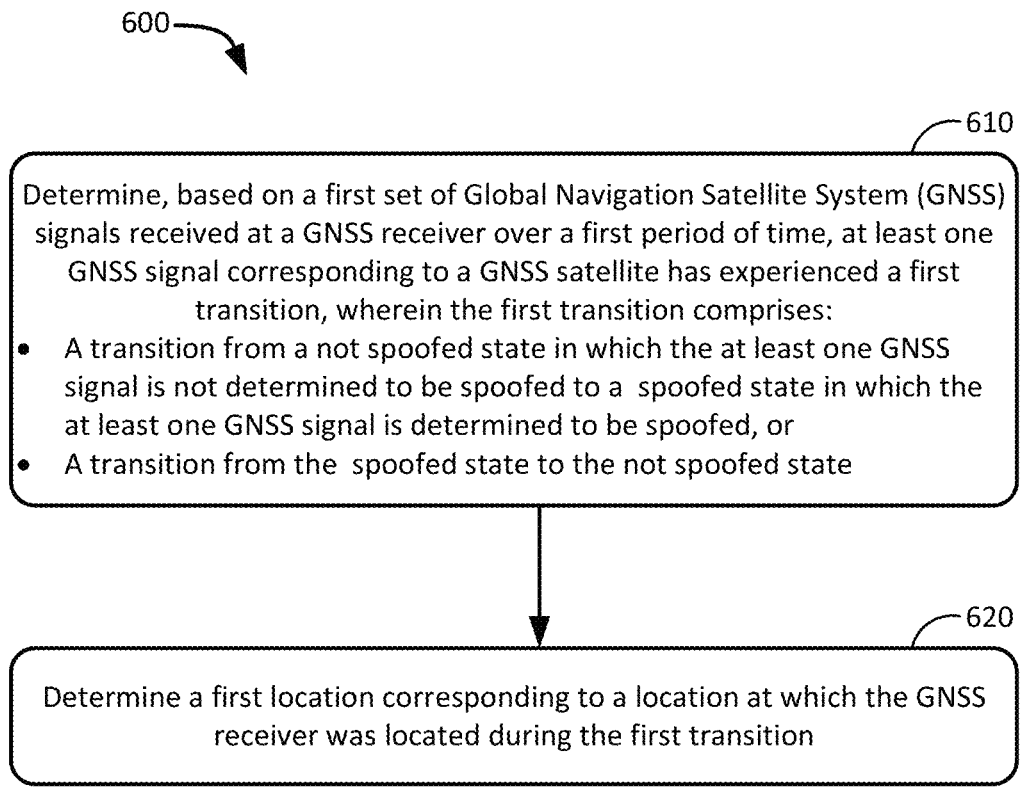
FIGS. 6 and 7 show example methods for detecting and mitigating spoofed satellite navigation signals.

Referring now to FIG. 6, FIG. 6 shows a flowchart of an example method for determining a boundary of a spoofing region identifying spoofed satellite signals, according to an embodiment. This example method 600 will be discussed with respect to the UE 300 shown in FIG. 3 and the system 500 shown in FIG. 5; however, any suitable UE, server, device, or system according to this disclosure may be employed. This includes, for example, the UE 800 of FIG. 8 described hereafter and/or the positioning system 100 of FIG. 1.

At block 610, the UE 300 determines based on a first set of Global Navigation Satellite System (GNSS) signals received at a GNSS receiver over a first period of time, at least one GNSS signal corresponding to a GNSS satellite has experienced a first transition, wherein the first transition comprises (i) a transition from a not spoofed state in which the at least one GNSS signal is not determined to be spoofed to a spoofed state in which the at least one GNSS signal is determined to be spoofed, or (ii) a transition from the spoofed state to the not spoofed state. As discussed above with respect to FIG. 3, the GNSS receiver 322 receives GNSS signals and outputs GNSS information periodically at some configured rate (e.g., at 1 Hz). Thus, over a period of time, multiple samples of GNSS information may be output by the GNSS receiver 322 and used to determine the first transition. As noted in the embodiments previously discussed, determining the GNSS signal corresponding to the GNSS satellite has experienced the first transition may comprise determining a discrepancy associated with the first set of GNSS signals based on a detected change in signal characteristics of the GNSS signal corresponding to the GNSS satellite. According to some embodiments, these signal characteristics may comprise frequency, phase, or signal strength, or a combination thereof. Additionally or alternatively determining the GNSS signal corresponding to the GNSS satellite has experienced the first transition may comprise determining a discrepancy associated with the first set of GNSS signals based on a detected change in data obtained from the GNSS signal corresponding to the GNSS satellite. According to some embodiments, the data may comprise location, velocity, heading, time, date, almanac data, or ephemeris data, or a combination thereof. As discussed above with respect to FIG. 3, the UE 300 can execute spoof detection software 310 to determine one or more discrepancies associated with the GNSS information and to determine that a GNSS signal is likely being spoofed. For example, the spoof detection software 310 may execute a model based on the received GNSS information and one or more identified discrepancies. As discussed above, such discrepancies may be based on navigational data, GNSS status data, or time information, generally as discussed above with respect to FIG. 3. In some examples, the spoof detection software 310 may compare or otherwise analyze information from other positioning subsystems, e.g., positioning subsystems 324-328, to determine discrepancies associated with the GNSS information, such as discussed above with respect to FIG. 3. The spoof detection software 310 may then output a likelihood that the GNSS signal is being spoofed. If the likelihood is over a predetermined threshold, the spoof detection software 310 may determine that the GNSS is likely being spoofed. If the GNSS receiver is not yet operating in a spoofed state (e.g., is operating in a not spoofed state), it may then transition from the not spoofed state to the spoofed state. Suitable means for performing such functions include the UE 300 and the spoof detection software 310.

Determining a transition from a spoofed state to a not spoofed state may be similar to the process described above with regard to determining the transition from a not spoofed state to a spoofed state. As discussed above with respect to FIG. 3, the GNSS receiver 322 may continue to provide GNSS information even after the spoofing is detected. Thus, the spoof detection software 310 may continue to receive GNSS information from the GNSS receiver 322 and continues to determine whether the spoofing is present or has ceased. When spoofing is determined to be no longer present, the spoof detection software 310 may then determine a transition location (e.g., as illustrated in FIGS. 4A and 4B) indicating the exit point from a spoofing region. This location may be based on non-GNSS sources, GNSS information from non-spoofed GNSS signals, and/or GNSS information obtained after spoofing has ceased.

At block 620, the UE 300 determines a first location corresponding to a location at which the GNSS receiver was located during the first transition. As discussed above, the spoof detection software 310 can determine a transition location based on transitioning from a spoofed state to a not spoofed state, or vice versa. This transition location may be determined based on received true GNSS signals and/or location estimates from one or more non-GNSS sources (e.g., RAT-based positioning, sensor-based positioning, etc.).

As previously described, determining a spoofing region can occur any of a variety of ways, using transitions from a not spoofed state to a spoofed state, or vice versa, to determine boundaries of the spoofing region. As such, according to some embodiments, the method 600 may further comprise determining the spoofing region based at least in part on the first location. As previously noted, a spoofing region may be based on two transition points, such as by determining a one-dimensional spoofing region or generating a circular spoofing region based on the two transition points. Alternatively, the spoof detection software 310 may wait until an additional transition location is determined based on a subsequent detection of spoofed GNSS signals within sufficiently close range to the previously detected transition locations. In such an example, the spoof detection software 310 may determine a spoofing region after it is able to construct a geopolygons based on the three (or more) determined transition locations. Additional details are provided hereafter. In some examples, however, rather than determining the spoofing region locally at the UE 300, the UE 300 may transmit the transition location information to a server 550, which may use the information to identify a previously identified spoofing region and transmit information describing the spoofing region to the UE 300. Thus, in some examples, determining the spoofing region may include receiving the spoofing region from the server 550. Additionally or alternatively, as discussed in more detail below, determining the spoofing region may include receiving a preliminary spoofing region from the server 550.

Optionally, the method 600 may further comprise sending data indicating the spoofing region to a server. In instances in which the first transition comprises the transition from the not spoofed state to the spoofed state, determining the first location may comprise determining the first location based on the first set of GNSS signals prior to the first transition. In embodiments in which the first transition comprises the transition from the spoofed state to the not spoofed state, determining the first location may be based on one or more locations determined after the first transition. According to some embodiments, the method may further comprise determining, based on a second set of GNSS signals received at the GNSS receiver over a second period of time, the at least one GNSS signal corresponding to the GNSS satellite has experienced a second transition. Here, the second transition comprises a transition from the spoofed state to the not spoofed state, or a transition from the not spoofed state to the spoofed state, and the method may further comprise determining a second location corresponding to a location at which the GNSS receiver was located during the second transition. In such embodiments, the method 600 may further comprise determining a spoofing region based at least in part on the first location and the second location.

Again, the spoofing region may be determined in various ways, depending on the first and second locations corresponding to the first and second transitions. According to some embodiments, for example, the first location and the second location may be located on the boundary of the spoofing region. In particular, they may be located on opposite (or substantially opposite) sides of a circular spoofing region, where the diameter of the circular spoofing region is based on the distance between the first and second locations. According to some embodiments, the method 600 may also comprise estimating a center or centroid of the spoofing region based on the first location and the second location, wherein determining the spoofing region comprises determining a substantially circular or substantially spherical region based on the center or centroid, and a distance from the center or centroid to the first location, the second location, or both.

Determining a spoofing region based on first and second locations (or any other number of locations) be complemented through the use of a server. The server can, for example, provide information (e.g., border locations, centers/centroid information, shape information, etc.) regarding the spoofing region that a device can use, together with local information, to determine the spoofing region. Thus, according to some embodiments, the method 600 may further comprise transmitting the first location and the second location to a server, wherein determining the spoofing region comprises receiving data indicating the spoofing region from the server. According to some embodiments, receiving the data indicating the spoofing region from the server may comprise receiving data indicating a plurality of locations, a shape and location of a preliminary spoofing region, or both from the server, and determining the spoofing region comprises determining a geopolygon comprising the spoofing region based on (i) the plurality of locations, the shape and location of a preliminary spoofing region, or both, and (ii) the first and second locations. Here, a preliminary spoofing region may refer to information regarding a spoofing region obtained by a server and used to complement local information at a device. For example, a preliminary spoofing region may comprise a circular region conveyed to a device by a server using information identifying the center and radius of the circular region. A device receiving the preliminary spoofing region can then determine the spoofing region by modifying the border of the preliminary spoofing region using the first and second locations.

As previously noted, three or more transition locations can be used to determine a spoofing region comprising a geopolygon. For example, according to some embodiments, the method 600 may further comprise determining, based on a third set of GNSS signals received at the GNSS receiver over a third period of time, the at least one GNSS signal corresponding to the GNSS satellite has experienced a third transition. Here, the third transition comprises a transition from the spoofed state to the not spoofed state, or a transition from the not spoofed state to the spoofed state. The method may further comprise determining a third location corresponding to a location at which the GNSS receiver was located during the third transition and determining the spoofing region may comprise determining a spoofing geopolygon based on the first location, the second location, and the third location. Suitable means for performing such functions include the UE 300 and the spoof detection software 310.

Embodiments of the method 600 may also include one or more additional operations.

As noted (e.g., with regard to FIG. 5), some embodiments may comprise transmitting data indicating the spoofing region to a server, which may be physically or geographically remote from the mobile device. For example, some embodiments of the method 600 may further comprise transmitting the first and second locations to a remote server, wherein determining the spoofing region comprises receiving the spoofing region from the remote server, and wherein the spoofing region based on the first and second locations. According to some embodiments, receiving the spoofing region from the remote server may comprise receiving a plurality of locations from the remote server, determining a geopolygon based on the plurality of locations and the first and second locations, and wherein determining the spoofing region is based on the geopolygon.

According to some embodiments, determining the discrepancy may be based on a detected change in signal characteristics of GNSS signals within the first set of GNSS signals. Signal characteristics can include, for example, frequency, phase, or signal strength, or a combination thereof. In thus, a change in signal characteristics may include a change in frequency, phase, signal strength, or combination thereof. Additionally or alternatively, according to some embodiments, determining the discrepancy may be based on a detected change in data obtained from GNSS signals within the first set of GNSS signals. Here, according to some embodiments, the data may comprise location, velocity, heading, time, date, almanac data, or ephemeris data, or a combination thereof.

Figure 7:
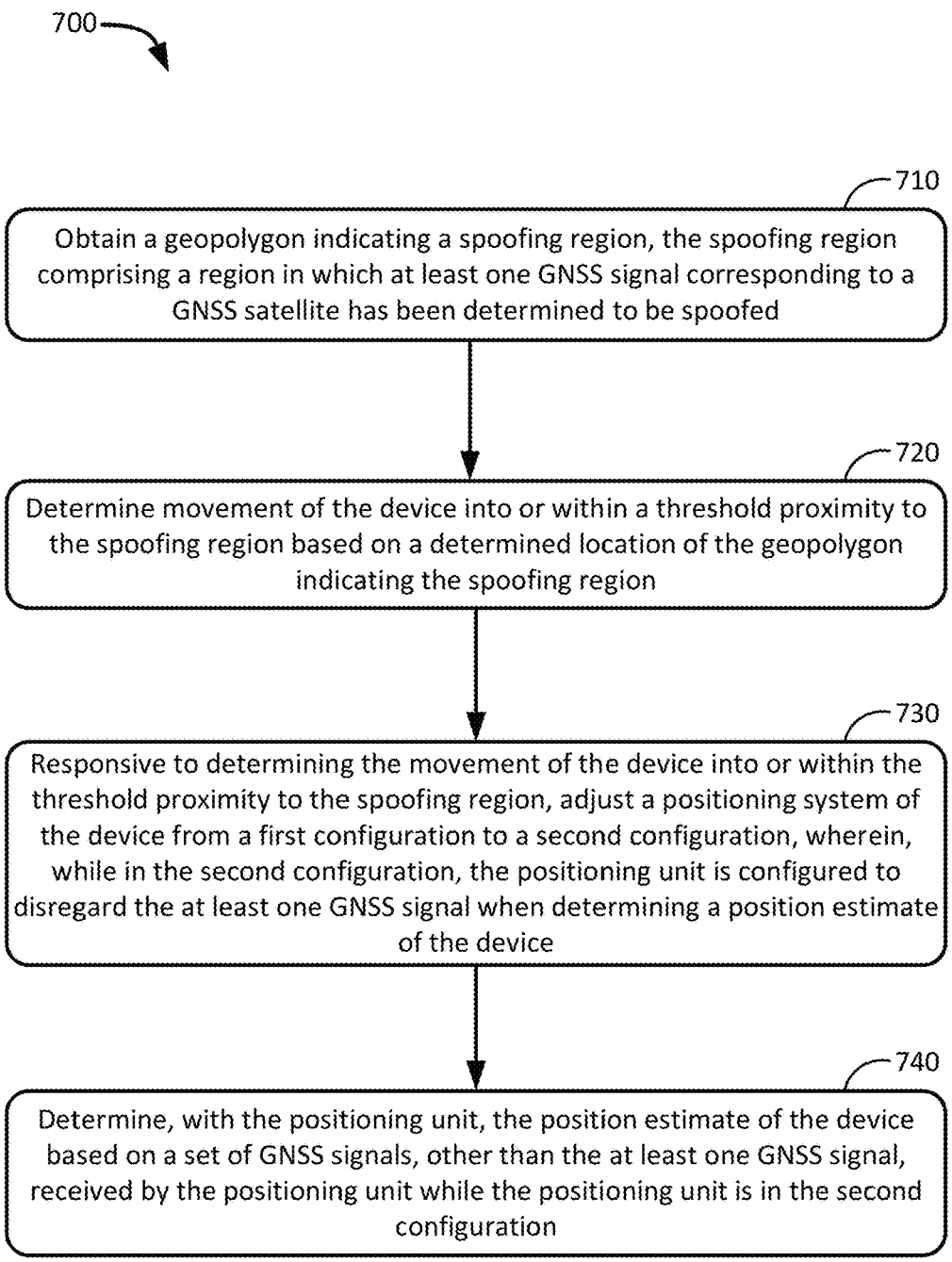

Referring now to FIG. 7, FIG. 7 shows a flowchart of a method 700 for compensating for spoofed satellite signals. This example method 700 will be discussed with respect to the UE 300 shown in FIG. 3 and the system 500 shown in FIG. 5; however, any suitable UE, device, server, or system according to this disclosure may be employed. Again, this may include, for example, the UE 800 of FIG. 8 described hereafter and/or the positioning system 100 of FIG. 1.

At block 710, the UE 300 obtains a geopolygon indicating a spoofing region, the spoofing region comprising a region in which at least one Global Navigation Satellite System (GNSS) signal corresponding to a GNSS satellite has been determined to be spoofed. In this example, the UE 300 may execute spoof detection software 310, which accesses data store 312 to obtain identifications of one or more geopolygons (and/or other shapes) indicating spoofing regions. In some examples, however, a UE 300 may transmit a request to a server 550 for identifications of one or more spoofing regions. In response, the server 550 may provide information indicating one or more spoofing regions within the vicinity of the UE 300 (e.g., within a threshold distance of the UE, within a larger region in which the UE is located, etc.). The UE 300 may then receive and store the received information. Different spoofing regions may overlap. Additionally or alternatively, each spoofing region may correspond to a particular GNSS band, group of bands, constellation, and/or combination of constellations that are determined to be spoofed. Suitable means for performing such functionality may include the UE 300 and the spoof detection software 312.

At block 720, the UE 300 determining movement into or within a threshold proximity to the spoofing region based on a location and the identification of the spoofing region. In this example, the spoof detection software 310 receives position information from the UE's positioning unit 320. The position information may be received from the GNSS receiver 322 or it may be received from any other subsystem 324-328 of the positioning unit 320, or it may use a combination of (e.g., fusion of) positioning information from multiple subsystems 322-328 to determining a location of the UE 300 and to determine the UE 300 has moved into or within a threshold proximity to a spoofing region. According to some embodiments, determining movement into or within a threshold proximity to the spoofing region may comprise anticipating movement of the UE 300. Such movement can be anticipated, for example, using a navigation application (e.g., wherein the navigation application plots a course through a spoofing region), historical data (e.g., where the UE 300 identifies historical patterns of movement through the spoofing region). Suitable means for performing such functionality may include the UE 300 and the spoof detection software 312.

At block 730, the UE 300, responsive to determining the movement of the device into or within the threshold proximity to the spoofing region, adjusts a positioning unit of the device from a first configuration to a second configuration, wherein, while in the second configuration, the positioning unit is configured to disregard the at least one GNSS signal when determining a position estimate of the device. As discussed above with respect to FIG. 3, the spoof detection software 310 may modify a configuration of the positioning unit 320 to obtain position information from one or more subsystems 324-328, such as by using GNSS-based positioning (excluding the at least one spoofed GNSS signal), WWAN positioning, Wi-Fi positioning, or inertial positioning, or a combination of any of these while the at least one GNSS signal is being spoofed. In some examples, the spoof detection software 310 may adjust a configuration of the GNSS receiver 322, such as to receive GNSS signals on a different band and/or constellation that may not be spoofed. Suitable means for performing such functionality may include the UE 300 and the spoof detection software 312.

At block 740, the UE 300 uses the positioning unit 320 to determine a position estimate of the device based on a first set of GNSS signals, excluding the at least one GNSS signal, received by the positioning unit while the positioning unit is in the second configuration. As discussed above, once the positioning unit 320 has been adjusted to a second configuration in which other positioning subsystems are employed and/or the configuration of the GNSS receiver 322 is adjusted to ignore the at least one GNSS signal, the positioning unit 320 may be used to determine the location of the UE 300. Suitable means for performing such functionality may include the UE 300 and the spoof detection software 312. At a later time, once the spoofing has ceased, the spoof detection software 320 may return the positioning unit 320 to its initial configuration and resume receiving GNSS information from the GNSS receiver as it was before the spoofing was detected.

As indicated previously, embodiments may include one or more additional features. For example, according to some embodiments, the positioning unit may comprise a GNSS receiver and a wireless communication receiver. In such embodiments, while in the second configuration, the positioning unit may be further configured to receive one or more positioning signals from one or more terrestrial transmitters with the wireless communication receiver, and determining the position estimate of the device is further based on the one or more positioning signals. Additionally or alternatively, the positioning unit may comprise a GNSS receiver and an inertial sensor, and wherein adjusting the positioning unit may comprise receiving signals from the inertial sensor. In such embodiments, while in the second configuration, the positioning unit may be further configured to receive movement data from the inertial sensor, and determining the position estimate of the device is further based on the movement data. According to some embodiments, positioning unit may comprise a GNSS receiver, and adjusting the positioning unit may comprise adjusting a configuration of the GNSS receiver. As further noted with regard to FIGS. 4A and 4B, for example, embodiments may determine transition locations when moving out of a spoofing region. As such, some embodiments of the method 700 may further comprise determining movement of the device out of or beyond the threshold proximity to the spoofing region, adjusting the positioning unit to the first configuration, and subsequent to adjusting the positioning unit to the first configuration, determining, with the positioning unit, a second position estimate of the device based on a second set of GNSS signals received by the positioning unit while the positioning unit is in the first configuration. Once the location of the devices determined it may be provided to different software and/or hardware components on and/or off the device, such as an operating system or application executed by the device, a separate device or server (e.g., via direct wireless communication or indirect communication links), a user interface of the device, etc.

FIG. 8 is a block diagram of an embodiment of a UE 800, which can be utilized as described in the embodiments described herein and in association with FIGS. 1-7. For example, the UE 800 can perform one or more of the functions of methods 600-700 of FIGS. 6-7. It should be noted that FIG. 8 is meant only to provide a generalized illustration of various components of UE 800, any or all of which may be utilized as appropriate. In other words, because UEs can vary widely in functionality, they may include only a portion of the components shown in FIG. 8. It can be noted that, in some instances, components illustrated by FIG. 8 can be localized to a single physical device and/or distributed among various networked devices, which may be disposed at different physical locations.

The UE 800 is shown comprising hardware elements that can be electrically coupled via a bus 805 (or may otherwise be in communication, as appropriate). The hardware elements may include one or more processors 810 which may comprise without limitation one or more general-purpose processors, one or more special-purpose processors (such as digital signal processing (DSP) chips, graphics acceleration processors, application specific integrated circuits (ASICs), and/or the like), and/or other processing structures, units, or means, which can be configured to perform one or more of the methods described herein. As shown in FIG. 8, some embodiments may have a separate DSP 820, depending on desired functionality. The UE 800 also may comprise one or more input devices 870, which may comprise without limitation one or more touch screens, touch pads, microphones, buttons, dials, switches, and/or the like; and one or more output devices 815, which may comprise without limitation, one or more displays, light emitting diodes (LEDs), speakers, and/or the like.

The UE 800 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 800 to communicate via the networks described herein with regard to FIG. 1. The wireless communication interface 830 may permit data to be communicated with a network, base stations (e.g., eNBs, ng-eNBs, and/or gNBs), and/or other network components, computer systems, transmission/reception points (TRPs), and/or any other electronic devices described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 800 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 800 can further include sensor(s) 840. Such sensors may comprise, without limitation, one or more inertial sensors (e.g., radar 842, LIDAR 844, sonar 846, accelerometer(s), gyroscope(s), and or other Inertial Measurement Units (IMUs)), camera(s) 848, magnetometer(s), compass, altimeter(s), microphone(s), proximity sensor(s), light sensor(s), barometer, and the like, some of which may be used to complement and/or facilitate the functionality described herein.

Embodiments of the UE 800 may also include a Global Navigation Satellite System (GNSS) receiver 880 capable of receiving signals 884 from one or more GNSS satellites using a GNSS antenna 882 (which may be combined in some implementations with an antenna(s) 832). Such positioning can be utilized to complement and/or incorporate the techniques described herein. The GNSS receiver 880 can extract a position of the UE 800, using conventional techniques, from GNSS satellites of a GNSS system, such as Global Positioning System (GPS), Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 880 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 810 or DSP 820.

The UE 800 may further include and/or be in communication with a memory 860. The memory 860 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the UE 800 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 800 (e.g., using processor(s) 810). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for determining a boundary of a spoofing region identifying spoofed satellite signals, the method comprising: determining, based on a first set of Global Navigation Satellite System (GNSS) signals received at a GNSS receiver over a first period of time, at least one GNSS signal corresponding to a GNSS satellite has experienced a first transition, wherein the first transition comprises: a transition from a not spoofed state in which the at least one GNSS signal is not determined to be spoofed to a spoofed state in which the at least one GNSS signal is determined to be spoofed, or a transition from the spoofed state to the not spoofed state; and determining a first location corresponding to a location at which the GNSS receiver was located during the first transition.

Clause 2. The method of clause 1, further comprising determining the spoofing region based at least in part on the first location.

Clause 3. The method of any of clauses 1-2 further comprising sending data indicating the spoofing region to a server.

Clause 4. The method of any of clauses 1-3 wherein the first transition comprises the transition from the not spoofed state to the spoofed state; and determining the first location comprises determining the first location based on the first set of GNSS signals prior to the first transition.

Clause 5. The method of any of clauses 1-3 wherein the first transition comprises the transition from the spoofed state to the not spoofed state; and determining the first location is based on one or more locations determined after the first transition.

Clause 6. The method of any of clauses 1-5 the first location is based, at least in part, on one or more non-GNSS positioning sources.

Clause 7. The method of any of clauses 1 and 3-6 further comprising determining, based on a second set of GNSS signals received at the GNSS receiver over a second period of time, the at least one GNSS signal corresponding to the GNSS satellite has experienced a second transition, wherein the second transition comprises: a transition from the spoofed state to the not spoofed state, or a transition from the not spoofed state to the spoofed state; determining a second location corresponding to a location at which the GNSS receiver was located during the second transition; and determining a spoofing region based at least in part on the first location and the second location.

Clause 8. The method of clause 7 wherein the first location and the second location are located on the boundary of the spoofing region.

Clause 9. The method of clause 7 further comprising determining, based on a third set of GNSS signals received at the GNSS receiver over a third period of time, the at least one GNSS signal corresponding to the GNSS satellite has experienced a third transition, wherein the third transition comprises: a transition from the spoofed state to the not spoofed state, or a transition from the not spoofed state to the spoofed state; and determining a third location corresponding to a location at which the GNSS receiver was located during the third transition; wherein determining the spoofing region comprises determining a spoofing geopolygon based on the first location, the second location, and the third location.

Clause 10. The method of clause 7 further comprising estimating a center or centroid of the spoofing region based on the first location and the second location, wherein determining the spoofing region comprises determining a substantially circular or substantially spherical region based on: the center or centroid, and a distance from the center or centroid to the first location, the second location, or both.

Clause 11. The method of clause 7 further comprising transmitting the first location and the second location to a server, wherein determining the spoofing region comprises receiving data indicating the spoofing region from the server.

Clause 12. The method of clause 11 wherein receiving the data indicating the spoofing region from the server comprises receiving data indicating a plurality of locations, a shape and location of a preliminary spoofing region, or both from the server; and determining the spoofing region comprises determining a geopolygon comprising the spoofing region based on (i) the plurality of locations, the shape and location of a preliminary spoofing region, or both, and (ii) the first and second locations.

Clause 13. The method of any of clauses 1-12 wherein determining the GNSS signal corresponding to the GNSS satellite has experienced the first transition comprises determining a discrepancy associated with the first set of GNSS signals based on a detected change in signal characteristics of the GNSS signal corresponding to the GNSS satellite.

Clause 14. The method of clause 13 wherein the signal characteristics comprise frequency, phase, or signal strength, or a combination thereof.

Clause 15. The method of any of clauses 1-14 wherein determining the GNSS signal corresponding to the GNSS satellite has experienced the first transition comprises determining a discrepancy associated with the first set of GNSS signals based on a detected change in data obtained from the GNSS signal corresponding to the GNSS satellite.

Clause 16. The method of clause 15 wherein the data comprises location, velocity, heading, time, date, almanac data, or ephemeris data, or a combination thereof.

Clause 17. A method for compensating for spoofed satellite signals, the method comprising: obtaining, by a device, a geopolygon indicating a spoofing region, the spoofing region comprising a region in which at least one Global Navigation Satellite System (GNSS) signal corresponding to a GNSS satellite has been determined to be spoofed; determining movement of the device into or within a threshold proximity to the spoofing region based on a determined location of the device and the geopolygon indicating the spoofing region; responsive to determining the movement of the device into or within the threshold proximity to the spoofing region, adjusting a positioning unit of the device from a first configuration to a second configuration, wherein, while in the second configuration, the positioning unit is configured to disregard the at least one GNSS signal when determining a position estimate of the device; and determining, with the positioning unit, the position estimate of the device based on a first set of GNSS signals, excluding the at least one GNSS signal, received by the positioning unit while the positioning unit is in the second configuration.

Clause 18. The method of clause 17, wherein the positioning unit comprises a GNSS receiver and a wireless communication receiver, and wherein: while in the second configuration, the positioning unit is further configured to receive one or more positioning signals from one or more terrestrial transmitters with the wireless communication receiver, and determining the position estimate of the device is further based on the one or more positioning signals.

Clause 19. The method of clause 18 wherein the positioning unit comprises a GNSS receiver and an inertial sensor, and wherein: while in the second configuration, the positioning unit is further configured to receive movement data from the inertial sensor, and determining the position estimate of the device is further based on the movement data.

Clause 20. The method of clause 19 wherein the positioning unit comprises a GNSS receiver, and wherein adjusting the positioning unit comprises adjusting a configuration of the GNSS receiver.

Clause 21. The method of any of clauses 17-20 further comprising determining movement of the device out of or beyond the threshold proximity to the spoofing region; adjusting the positioning unit to the first configuration; and subsequent to adjusting the positioning unit to the first configuration, determining, with the positioning unit, a second position estimate of the device based on a second set of GNSS signals received by the positioning unit while the positioning unit is in the first configuration.

Clause 22. A device for determining a boundary of a spoofing region identifying spoofed satellite signals, the device comprising: a transceiver; a memory; and one or more processors communicatively coupled with the transceiver and the memory, wherein the one or more processors are configured to: determine, based on a first set of Global Navigation Satellite System (GNSS) signals received at a GNSS receiver over a first period of time, at least one GNSS signal corresponding to a GNSS satellite has experienced a first transition, wherein the first transition comprises: a transition from a not spoofed state in which the at least one GNSS signal is not determined to be spoofed to a spoofed state in which the at least one GNSS signal is determined to be spoofed, or a transition from the spoofed state to the not spoofed state; and determine a first location corresponding to a location at which the GNSS receiver was located during the first transition.

Clause 23. The device of clause 22, wherein the one or more processors are further configured to determine the spoofing region based at least in part on the first location.

Clause 24. The device of any of clauses 22-23 wherein the one or more processors are further configured to send data indicating the spoofing region to a server.

Clause 25. The device of any of clauses 22-24 wherein the first transition comprises the transition from the not spoofed state to the spoofed state; and determining the first location comprises determining the first location based on the first set of GNSS signals prior to the first transition.

Clause 26. The device of any of clauses 22-24 wherein the first transition comprises the transition from the spoofed state to the not spoofed state; and determining the first location is based on one or more locations determined after the first transition.

Clause 27. The device of any of clauses 22-26 the first location is based, at least in part, on one or more non-GNSS positioning sources.

Clause 28. The device of any of clauses 22 and 24-27 wherein the one or more processors are further configured to: determine, based on a second set of GNSS signals received at the GNSS receiver over a second period of time, the at least one GNSS signal corresponding to the GNSS satellite has experienced a second transition, wherein the second transition comprises: a transition from the spoofed state to the not spoofed state, or a transition from the not spoofed state to the spoofed state; determine a second location corresponding to a location at which the GNSS receiver was located during the second transition; and determine a spoofing region based at least in part on the first location and the second location.

Clause 29. The device of clause 28 wherein the first location and the second location are located on the boundary of the spoofing region.

Clause 30. The device of clause 28 wherein the one or more processors are further configured to: determine, based on a third set of GNSS signals received at the GNSS receiver over a third period of time, the at least one GNSS signal corresponding to the GNSS satellite has experienced a third transition, wherein the third transition comprises: a transition from the spoofed state to the not spoofed state, or a transition from the not spoofed state to the spoofed state; and determine a third location corresponding to a location at which the GNSS receiver was located during the third transition; wherein the one or more processors, when determining the spoofing region, are configured to determine a spoofing geopolygon based on the first location, second location, and the third location.

Clause 31. The device of clause 28 wherein the one or more processors are further configured to estimate a center or centroid of the spoofing region based on the first location and the second location, wherein determining the spoofing region comprises determining a substantially circular or substantially spherical region based on: the center or centroid, and a distance from the center or centroid to the first location, the second location, or both.

Clause 32. The device of clause 28 wherein the one or more processors are further configured to transmit the first location and the second location to a server, wherein determining the spoofing region comprises receiving data indicating the spoofing region from the server.

Clause 33. The device of clause 32 wherein receive the data indicating the spoofing region from the server comprises receiving data indicating a plurality of locations, a shape and location of a preliminary spoofing region, or both from the server; and determine the spoofing region comprises determining a geopolygon comprising the spoofing region based on (i) the plurality of locations, the shape and location of a preliminary spoofing region, or both, and (ii) the first and second locations.

Clause 34. The device of any of clauses 22-33 wherein the one or more processors, when determining the GNSS signal corresponding to the GNSS satellite has experienced the first transition, are configured to determine a discrepancy associated with the first set of GNSS signals based on a detected change in signal characteristics of the GNSS signal corresponding to the GNSS satellite.

Clause 35. The device of clause 34 wherein the signal characteristics comprise frequency, phase, or signal strength, or a combination thereof.

Clause 36. The device of any of clauses 22-35 wherein the one or more processors, when determining the GNSS signal corresponding to the GNSS satellite has experienced the first transition, are configured to determine a discrepancy associated with the first set of GNSS signals based on a detected change in data obtained from the GNSS signal corresponding to the GNSS satellite.

Clause 37. The device of clause 36 wherein the data comprises location, velocity, heading, time, date, almanac data, or ephemeris data, or a combination thereof.

Clause 38. A device for compensating for spoofed satellite signals, the device comprising: a transceiver; a memory; and one or more processors communicatively coupled with the transceiver and the memory, wherein the one or more processors are configured to: obtain a geopolygon indicating a spoofing region, the spoofing region comprising a region in which at least one Global Navigation Satellite System (GNSS) signal corresponding to a GNSS satellite has been determined to be spoofed; determine movement of the device into or within a threshold proximity to the spoofing region based on a determined location of the device and the geopolygon indicating the spoofing region; responsive to determining the movement of the device into or within the threshold proximity to the spoofing region, adjusting a positioning unit of the device from a first configuration to a second configuration, wherein, while in the second configuration, the positioning unit is configured to disregard the at least one GNSS signal when determining a position estimate of the device; and determine, with the positioning unit, the position estimate of the device based on a first set of GNSS signals, excluding the at least one GNSS signal, received by the positioning unit while the positioning unit is in the second configuration.

Clause 39. The device of clause 38, wherein the positioning unit comprises a GNSS receiver and a wireless communication receiver, and wherein: while in the second configuration, the positioning unit is further configured to receive one or more positioning signals from one or more terrestrial transmitters with the wireless communication receiver, and determining the position estimate of the device is further based on the one or more positioning signals.

Clause 40. The device of clause 39 wherein the positioning unit comprises a GNSS receiver and an inertial sensor, and wherein: while in the second configuration, the positioning unit is further configured to receive movement data from the inertial sensor, and determining the position estimate of the device is further based on the movement data.

Clause 41. The device of clause 40 wherein the positioning unit comprises a GNSS receiver, and wherein adjusting the positioning unit comprises adjusting a configuration of the GNSS receiver.

Clause 42. The device of any of clauses 38-41 wherein the one or more processors are further configured to: determine movement of the device out of or beyond the threshold proximity to the spoofing region; adjust the positioning unit to the first configuration; and subsequent to adjusting the positioning unit to the first configuration, determining, with the positioning unit, a second position estimate of the device based on a second set of GNSS signals received by the positioning unit while the positioning unit is in the first configuration.

Clause 43. A non-transitory computer-readable medium storing instructions comprising code for performing the method of any of clauses 1-21.

Clause 44. An apparatus having means for performing the method of any of clauses 1-21.

What is claimed is:

1. A method for determining a spoofing region containing spoofed satellite signals, the method comprising:
   determining, based on a first set of Global Navigation Satellite System (GNSS) signals received at a GNSS receiver over a first period of time, at least one GNSS signal corresponding to a GNSS satellite has experienced a first transition, wherein the first transition comprises:
      a transition from a not spoofed state in which the at least one GNSS signal is not determined to be spoofed to a spoofed state in which the at least one GNSS signal is determined to be spoofed, or
      a transition from the spoofed state to the not spoofed state;
   determining a first location corresponding to a location at which the GNSS receiver was located during the first transition;
   determining the spoofing region based at least in part on the first location; and
   sending data indicating the spoofing region to a server.

2. The method of claim 1, wherein:
   the first transition comprises the transition from the not spoofed state to the spoofed state; and
   determining the first location comprises determining the first location based on the first set of GNSS signals prior to the first transition.

3. The method of claim 1, wherein:
   the first transition comprises the transition from the spoofed state to the not spoofed state; and
   determining the first location is based on one or more locations determined after the first transition.

4. The method of claim 1, the first location is based, at least in part, on one or more non-GNSS positioning sources.

5. The method of claim 1, further comprising:
   determining, based on a second set of GNSS signals received at the GNSS receiver over a second period of time, the at least one GNSS signal corresponding to the GNSS satellite has experienced a second transition, wherein the second transition comprises:
      a transition from the spoofed state to the not spoofed state, or
      a transition from the not spoofed state to the spoofed state;
   determining a second location corresponding to a location at which the GNSS receiver was located during the second transition; and
   determining the spoofing region based at least in part on the first location and the second location.

6. The method of claim 5, wherein the first location and the second location are located on a boundary of the spoofing region.

7. The method of claim 5, further comprising:
   determining, based on a third set of GNSS signals received at the GNSS receiver over a third period of time, the at least one GNSS signal corresponding to the GNSS satellite has experienced a third transition, wherein the third transition comprises:
      a transition from the spoofed state to the not spoofed state, or
      a transition from the not spoofed state to the spoofed state; and
   determining a third location corresponding to a location at which the GNSS receiver was located during the third transition;
   wherein determining the spoofing region comprises determining a spoofing geopolygon based on the first location, the second location, and the third location.

8. The method of claim 5, further comprising estimating a center or centroid of the spoofing region based on the first location and the second location, wherein determining the spoofing region comprises determining a substantially circular or substantially spherical region based on:
   the center or centroid, and
   a distance from the center or centroid to the first location, the second location, or both.

9. The method of claim 5, further comprising transmitting the first location and the second location to a server, wherein determining the spoofing region comprises receiving data indicating the spoofing region from the server.

10. The method of claim 9, wherein:
    receiving the data indicating the spoofing region from the server comprises receiving data indicating a plurality of locations, or a shape and location of a preliminary spoofing region, or both from the server; and
    determining the spoofing region comprises determining a geopolygon comprising the spoofing region based on (i) the plurality of locations, or the shape and location of the preliminary spoofing region, or both, and (ii) the first location and the second location.

11. The method of claim 1, wherein determining the at least one GNSS signal corresponding to the GNSS satellite has experienced the first transition comprises determining a discrepancy associated with the first set of GNSS signals based on a detected change in signal characteristics of the at least one GNSS signal corresponding to the GNSS satellite.

12. The method of claim 11, wherein the signal characteristics comprise frequency, phase, or signal strength, or a combination thereof.

13. The method of claim 1, wherein determining the at least one GNSS signal corresponding to the GNSS satellite has experienced the first transition comprises determining a discrepancy associated with the first set of GNSS signals based on a detected change in data obtained from the at least one GNSS signal corresponding to the GNSS satellite.

14. The method of claim 13, wherein the data comprises location, velocity, heading, time, date, almanac data, or ephemeris data, or a combination thereof.

15. A device for determining a spoofing region containing spoofed satellite signals, the device comprising:
    a GNSS receiver;
    a memory; and
    one or more processors communicatively coupled with the GNSS receiver and the memory, wherein the one or more processors are configured to:
       determine, based on a first set of Global Navigation Satellite System (GNSS) signals received at the GNSS receiver over a first period of time, at least one GNSS signal corresponding to a GNSS satellite has experienced a first transition, wherein the first transition comprises:
          a transition from a not spoofed state in which the at least one GNSS signal is not determined to be spoofed to a spoofed state in which the at least one GNSS signal is determined to be spoofed, or
          a transition from the spoofed state to the not spoofed state;
       determine a first location corresponding to a location at which the device was located during the first transition;

determine the spoofing region based at least in part on the first location; and send data indicating the spoofing region to a server.

16. The device of claim 15, wherein, to determine the first location, and in response to the first transition comprising the transition from the not spoofed state to the spoofed state, the one or more processors are configured to determine the first location based on the first set of GNSS signals prior to the first transition.

17. The device of claim 15, wherein, to determine the first location, and in response to the first transition comprising the transition from the spoofed state to the not spoofed state, the one or more processors are configured to determine the first location based on one or more locations determined after the first transition.

18. The device of claim 15, the one or more processors are configured to determine the first location based, at least in part, on one or more non-GNSS positioning sources.

19. The device of claim 15, wherein the one or more processors are further configured to:
    determine, based on a second set of GNSS signals received at the GNSS receiver over a second period of time, the at least one GNSS signal corresponding to the GNSS satellite has experienced a second transition, wherein the second transition comprises:
        a transition from the spoofed state to the not spoofed state, or
        a transition from the not spoofed state to the spoofed state;
    determine a second location corresponding to a location at which the GNSS receiver was located during the second transition; and
    determine the spoofing region based at least in part on the first location and the second location.

20. The device of claim 19, wherein the one or more processors are configured to determine the spoofing region such that the first location and the second location are located on a boundary of the spoofing region.

21. The device of claim 19, wherein the one or more processors are further configured to:
    determine, based on a third set of GNSS signals received at the GNSS receiver over a third period of time, the at least one GNSS signal corresponding to the GNSS satellite has experienced a third transition, wherein the third transition comprises:
        a transition from the spoofed state to the not spoofed state, or
        a transition from the not spoofed state to the spoofed state; and
    determine a third location corresponding to a location at which the GNSS receiver was located during the third transition;
    wherein to determine the spoofing region, the one or more processors are configured to determine a spoofing geopolygon based on the first location, the second location, and the third location.

22. The device of claim 19, wherein the one or more processors are further configured to estimate a center or centroid of the spoofing region based on the first location and the second location, and wherein, to determine the spoofing region, the one or more processors are configured to determine a substantially circular or substantially spherical region based on:
    the center or centroid, and
    a distance from the center or centroid to the first location, the second location, or both.

23. The device of claim 19, further comprising a transceiver, wherein the one or more processors are further configured to transmit the first location and the second location to a server via the transceiver, and wherein, to determine the spoofing region, the one or more processors are configured to receive data indicating the spoofing region from the server via the transceiver.

24. The device of claim 23, wherein:
    to receive the data indicating the spoofing region from the server, the one or more processors are configured to receive data indicating a plurality of locations, or a shape and location of a preliminary spoofing region, or both from the server; and
    to determine the spoofing region, the one or more processors are configured to determine a geopolygon comprising the spoofing region based on (i) the plurality of locations, or the shape and location of the preliminary spoofing region, or both, and (ii) the first location and the second location.

25. The device of claim 15, wherein to determine the at least one GNSS signal corresponding to the GNSS satellite has experienced the first transition, the one or more processors are configured to determine a discrepancy associated with the first set of GNSS signals based on a detected change in signal characteristics of the at least one GNSS signal corresponding to the GNSS satellite.

26. The device of claim 25, wherein the signal characteristics comprise frequency, phase, or signal strength, or a combination thereof.

27. The device of claim 15, wherein to determine the at least one GNSS signal corresponding to the GNSS satellite has experienced the first transition, the one or more processors are configured to determine a discrepancy associated with the first set of GNSS signals based on a detected change in data obtained from the at least one GNSS signal corresponding to the GNSS satellite.

28. The device of claim 27, wherein the data comprises location, velocity, heading, time, date, almanac data, or ephemeris data, or a combination thereof.

* * * * *